United States Patent
Choi

(10) Patent No.: US 11,736,833 B1
(45) Date of Patent: Aug. 22, 2023

(54) HIGH DYNAMIC RANGE CMOS IMAGE SENSOR PIXEL WITH REDUCED METAL-INSULATOR-METAL LATERAL OVERFLOW INTEGRATION CAPACITOR LAG

(71) Applicant: OMNIVISION TECHNOLOGIES, INC., Santa Clara, CA (US)

(72) Inventor: Woon Il Choi, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/849,354

(22) Filed: Jun. 24, 2022

(51) Int. Cl.
*H04N 25/77* (2023.01)
*H04N 25/75* (2023.01)
*H04N 25/57* (2023.01)
*H04N 23/741* (2023.01)

(52) U.S. Cl.
CPC ............. *H04N 25/77* (2023.01); *H04N 25/75* (2023.01); *H04N 25/57* (2023.01)

(58) Field of Classification Search
CPC ........ H04N 25/57; H04N 25/75; H04N 25/77; H04N 23/741
See application file for complete search history.

(56) References Cited

U.S. PATENT DOCUMENTS

| | | | |
|---|---|---|---|
| 4,323,986 A | 4/1982 | Malaviva | |
| 11,140,352 B1* | 10/2021 | Dai | H04N 25/585 |
| 11,212,457 B2 | 12/2021 | Dai et al. | |
| 11,348,956 B2* | 5/2022 | Choi | H01L 27/14641 |
| 11,399,150 B2* | 5/2022 | Gao | H04N 25/65 |
| 2015/0124132 A1* | 5/2015 | Mabuchi | H04N 25/53 348/296 |
| 2017/0324919 A1* | 11/2017 | Mlinar | H04N 25/778 |
| 2017/0347047 A1* | 11/2017 | Mao | H01L 27/14641 |
| 2021/0136275 A1* | 5/2021 | Solhusvik | H04N 25/771 |
| 2021/0168312 A1 | 6/2021 | Madurawe et al. | |
| 2021/0183926 A1 | 6/2021 | Choi et al. | |
| 2021/0377435 A1* | 12/2021 | Dai | H04N 25/585 |
| 2023/0164447 A1* | 5/2023 | Wang | H04N 25/741 |

OTHER PUBLICATIONS

Innocent, M., "Modeling, Characterization and Simulation of Dielectric Absorption in Capacitors in Image Sensors", 2021 International Image Sensor Workshop, publication date Sep. 13, 2021 (4 pages).
Sakano, Y. et al., "A 132dB Single-Exposure-Dynamic-Range CMOS Image Sensor with High Temperature Tolerance", 2020 IEEE International Solid-State Circuits Conference, Feb. 17, 2020 (22 pages).

* cited by examiner

Primary Examiner — Marly S Camargo
(74) Attorney, Agent, or Firm — Perkins Coie LLP

(57) ABSTRACT

A pixel circuit includes a photodiode configured to photogenerate image charge in response to incident light. A transfer transistor is configured to transfer the image charge from the photodiode to a floating diffusion. A reset transistor coupled between a reset voltage source and the floating diffusion. A lateral overflow integration capacitor (LOFIC) includes an insulating region disposed between a first metal electrode and a second metal electrode. The first metal electrode is coupled to a bias voltage source, the second metal electrode is selectively coupled to the floating diffusion, and excess image charge photogenerated by the photodiode during an idle period is configured to overflow from the photodiode through the transfer transistor into the floating diffusion.

34 Claims, 13 Drawing Sheets

HIGH DYNAMIC RANGE CMOS IMAGE SENSOR PIXEL WITH REDUCED METAL-INSULATOR-METAL LATERAL OVERFLOW INTEGRATION CAPACITOR LAG

BACKGROUND INFORMATION

Field of the Disclosure

This disclosure relates generally to image sensors, and in particular but not exclusively, relates to high dynamic range (HDR) complementary metal oxide semiconductor (CMOS) image sensors.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and photogenerate image charge upon absorption of the image light. The image charge photogenerated by the pixels may be measured as analog output image signals on column bitlines that vary as a function of the incident image light. In other words, the amount of image charge photogenerated is proportional to the intensity of the image light, which are read out as analog signals from the column bitlines and converted to digital values to produce digital images (i.e., image data) that represent the external scene.

Standard image sensors have a limited dynamic range of approximately 60 to 70 dB. However, the luminance dynamic range of the real world is much larger. For instance, natural scenes often span a range of 90 dB and greater. In order to capture details in bright highlights and dim shadows simultaneously, high dynamic range (HDR) technologies have been used in image sensors to increase the captured dynamic range. One common technique to increase dynamic range is to merge multiple exposures captured with different exposure settings using standard (low dynamic range) image sensors into a single linear HDR image, which results in a much larger dynamic range image than a single exposure image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
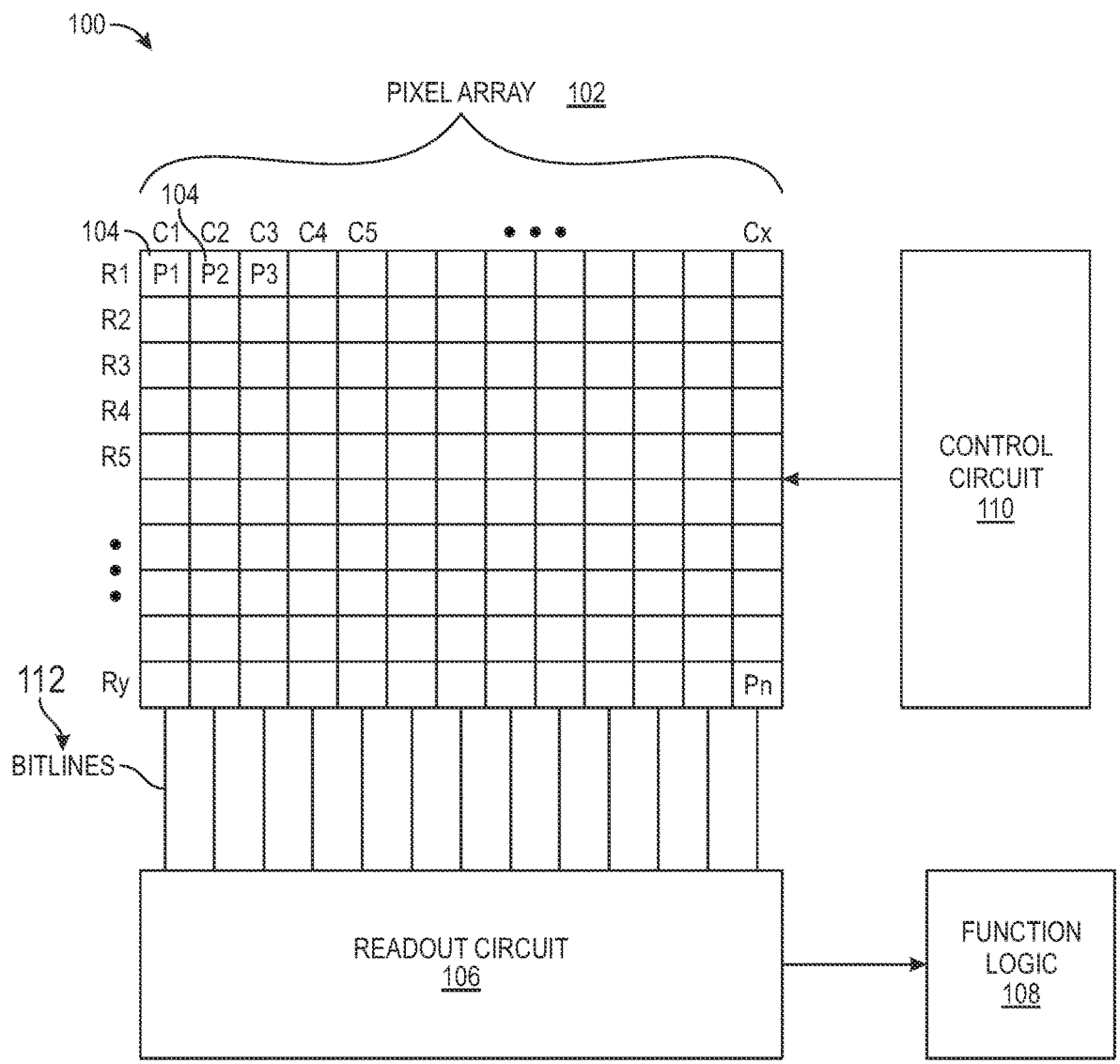
FIG. 1 illustrates one example of an imaging system including a pixel array in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system with a pixel array including pixel circuits with LOFICs providing reduced image lag are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system include a pixel array with pixel circuits including lateral overflow integration capacitors (LOFICs) configured to provide reduced image lag are disclosed. It is appreciated that LOFICs may be included in pixel circuits to increase the full well capacity of the pixel circuits and thereby increase high dynamic range capabilities of corresponding image sensors. LOFIC capacitance is positively correlated with full well capacity. Thus, as the capacitance of a LOFIC employed in a pixel circuit increases, the full well capacity of the pixel circuit also increases. For this reason, higher LOFIC capacitance is commonly desired. However, due to the huge RC loading as the capacitance of a LOFIC increases, the time required for row drivers of the imaging system to charge and/or reset the LOFIC also increases. Consequently, as the capacitances of LOFICs in pixel circuits increase, image lag increases, which causes slower frame rates.

It is appreciated that the image lag caused by LOFICs can be associated with the high dielectric constant or high-k material included in the insulation material of metal-insulator-metal (MIM) LOFICs due to the hysteresis characteristics and slow relaxation behavior of high-k materials that requires long discharge time (e.g., hundreds of milliseconds). The high-k material relaxation behavior can cause the degraded image quality such as image lag due to many mechanisms including trap-to-trap tunneling, structural relaxation, coupling with phonon energy, etc.

With fixed readout speeds and frame readout speeds of image sensors, it is appreciated that pixel circuits that include LOFICs can be configured such that during idle periods, any photogenerated charges are not overflowed and stored in the LOFIC and are reset during precharge periods to reduce image lag in accordance with the teachings of the present invention. Thus, as will be shown in the various examples below, an example pixel circuit includes a photodiode configured to photogenerate image charge in response to incident light. A floating diffusion is coupled to receive the image charge from the photodiode. In one example, a reset transistor is coupled between a bias voltage source and the floating diffusion. In another example, the reset transistor is coupled between a reset voltage source and the floating diffusion. The reset transistor is configured to be switched in response to a reset control signal. The pixel circuit also includes a LOFIC providing additional storage capacity configured to store image charge for high dynamic range (HDR) image acquisition.

In the various examples, the LOFIC is metal-insulator-metal (MIM) storage capacitor that includes a high-k insulating region disposed between a first metal electrode and a second metal electrode. In the various examples, the first metal electrode is coupled to a bias voltage source and the second metal electrode is coupled to the reset transistor locally through one or more circuit elements of the pixel circuit including the floating diffusion of the pixel circuit. In various examples, the reset transistor is turned on to couple both the first metal electrode and the second metal electrode of the LOFIC to the same bias voltage from the bias voltage source locally through the pixel circuit to reset or auto-zero the LOFIC. In various examples, the LOFIC may be reset or auto-zeroed during the idle period, as well as during a precharge period and during a LOFIC reset during a readout period of the pixel circuit.

In various examples, the LOFIC may be disposed in a location separated from an anti-blooming path from the photodiode of the pixel circuit such that there is no charging stress across the LOFIC during an idle period. Accordingly, active rows with LOFICs storing charges have plenty of idle period to fully discharge before the integration period in the next frame. In the various examples, the idle rows would have no charge across the LOFICs during the idle periods as the excess charges are configured to overflow into the one or more floating diffusions, which are then drained out through the reset transistor during idle periods. As such, excess image charge photogenerated by the photodiode during an idle period is configured to overflow from the photodiode through the transfer transistor into the floating diffusion instead of into the LOFIC. In the various examples, the excess image charge photogenerated by the photodiode during the integration period is configured to overflow from the photodiode into the LOFIC instead of into the floating diffusion.

To illustrate, FIG. 1 shows one example of an imaging system 100 having a pixel array with pixel circuits including LOFICs providing reduced image lag in accordance with the teachings of the present invention. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, ..., Pn) that are arranged into rows (e.g., R1 to Ry) and columns (e.g., C1 to Cx) to acquire image data of a person, place, object, etc., which can then be used to render an image of a person, place, object, etc.

In various examples, each pixel circuit 104 may include one or more photodiodes configured to photogenerate image charge in response to incident light. The image charge generated in the one or more photodiodes is transferred to a floating diffusion included in each pixel circuit 104, which may be converted to an image signal, which is then read out from each pixel circuit 104 by readout circuit 106 through column bitlines 112. As will be discussed, in the various examples, pixel circuits 104 are also be configured to provide HDR image signals, in which case, the image charge generated by the one or more photodiodes in bright lighting conditions may also be transferred to LOFICs and/or an additional floating diffusion in each pixel circuit 104 to store the image charge. For example, each pixel circuit 104 may include a LOFIC configured to store one or more excess image charges that overflow from the coupled one or more photodiodes during an integration period. In the various examples, readout circuit 106 may be configured to read out the image signals through column bitlines 112. In various examples, readout circuit 106 may include current sources, routing circuitry, and comparators that may be included in analog to digital converters or otherwise.

In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 is implemented on a single semiconductor wafer. In another example, imaging system 100 is on stacked semiconductor wafers. For example, pixel array 102 is implemented on a pixel wafer, and readout circuit 106, control circuit 110 and function logic 108 are implemented on an application specific integrated circuit (ASIC) wafer, where the pixel wafer and the ASIC wafer are stacked and interconnected by bonding (hybrid bonding, oxide bonding, or the like) or one or more through substrate vias (TSVs). For another example, pixel array 102 and control circuit 110 are implemented on a pixel wafer, and readout circuit 106, and function logic 108 are implemented on an ASIC wafer, where the pixel wafer and the ASIC wafer are stacked and interconnected by bonding (hybrid bonding, oxide bonding, or the like) or one or more through substrate vias (TSVs).

In one example, imaging system 100 may be included in a digital, cell phone, laptop computer, an endo scope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2A:
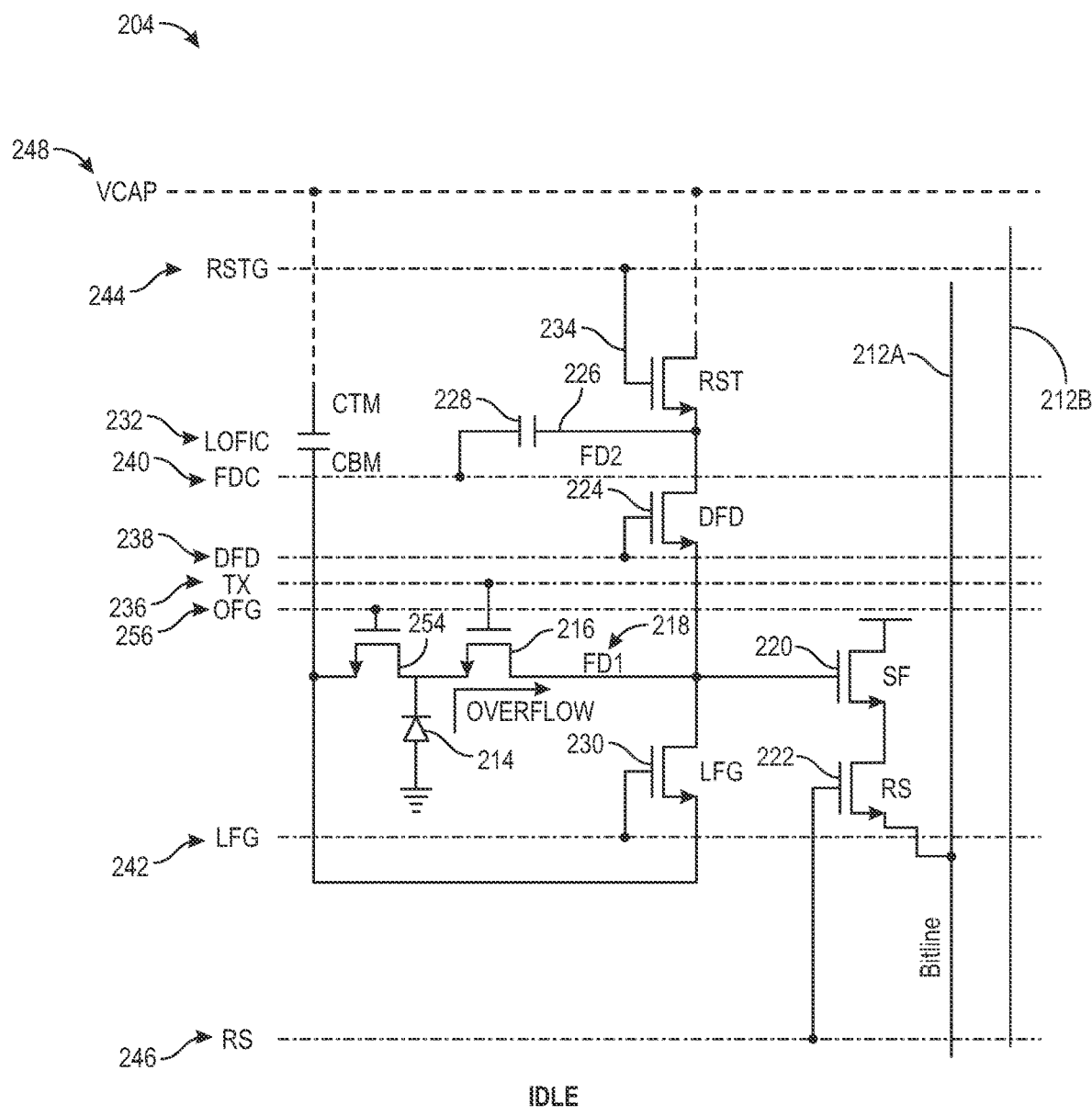
FIG. 2A illustrates a schematic of one example of a pixel circuit including a lateral overflow integration capacitor (LOFIC) during an idle period in accordance with the teachings of the present disclosure.

FIG. 2A illustrates a schematic of one example of a pixel circuit 204 including a LOFIC during an idle period in accordance with the teachings of the present disclosure. It is appreciated that the pixel circuit 204 of FIG. 2A may be an example of one of the pixel circuits 104 included in pixel array 102 as shown in FIG. 1, and that similarly named and numbered elements described above are coupled and function similarly below.

As shown in the depicted example, pixel circuit 204 includes a photodiode 214, which is configured to photogenerate image charge in response to incident light. In the depicted example, pixel circuit 204 also includes a first floating diffusion FD1 218 coupled to receive the image charge from the photodiode 214 through a transfer transistor 216. In the example, the transfer transistor 216 is coupled to be controlled in response to a transfer control signal TX 236 to transfer image charge from the photodiode 214 to the first floating diffusion FD1 218, for example during a readout period associated with the pixel circuit 204. In the example depicted in FIG. 2A, it is noted that during an idle period, excess image charge photogenerated in response to the bright lighting conditions is also configured to overflow from the photodiode 214 to the first floating diffusion FD1 218 through the transfer transistor 216, which as will be discussed is then drained out through the reset transistor 234 during the idle period. A source follower transistor 220 has a gate coupled to the first floating diffusion FD1 218, and a row select transistor 222 is coupled to the source follower transistor SF 220 such that the source follower transistor 220 and the row select transistor 222 are coupled between a power line and a bitline 212 to output an image signal from the pixel circuit 204 in response to a row select control signal RS 246 and the amount of charge at the gate of the source follower transistor 220.

In the example illustrated in FIG. 2A, a dual floating diffusion DFD transistor 224 is coupled between the first floating diffusion FD1 218 and a second capacitor 228. The second capacitor 228 is further coupled to a source of the reset transistor 234 and is also coupled to receive a floating diffusion capacitor signal FDC 240 for charge readout operation. The second capacitor 228 may be a junction capacitor combined with metal capacitor or metal oxide semiconductor capacitor (MOSCAP) for additional charge storage. The drain of the dual floating diffusion DFD transistor 224 that is coupled to the second capacitor 228 may also be referred to as a second floating diffusion FD2 226. The second capacitor 228 is coupled to receive excess image charge overflow from photodiode 214 through transfer transistor 216 and the dual floating diffusion DFD transistor 224. The reset transistor 234 is coupled between a bias voltage source 248 and the dual floating diffusion transistor 224. A drain of reset transistor 234 is coupled to bias voltage source 248, and a source of reset transistor 234 is coupled to the second capacitor 228 and the drain of the dual floating diffusion transistor 224. The dual floating diffusion transistor 224 is coupled to be controlled in response to a dual floating diffusion control signal DFD 238 and the reset transistor 234 is coupled to be controlled in response to a reset control signal RSTG 244.

As shown in the example depicted in FIG. 2A, an overflow transistor 254 is coupled to photodiode 214, and a lateral overflow integration capacitor (LOFIC) 232 is coupled between the bias voltage source 248 and the overflow transistor 254. In various examples, it is appreciated that the transfer transistor 216 as well as the overflow transistor 254 can be combined and form or are included in a bypass transistor having dual gate structure for minimizing unit pixel area. In the example, the dual gate structure included in the bypass transistor includes an overflow gate (e.g., overflow transistor 254) coupled between the LOFIC 232 and the photodiode 214, and a transfer gate (e.g., transfer transistor 216) coupled between the photodiode 214 and the first floating diffusion FD1 218. In the example, the overflow transistor 254 is controlled in response to an overflow control signal OFG 256. In the example, a low conversion gain transistor 230 is coupled between the LOFIC 232 and the first floating diffusion FD1 218. In the example, the low conversion gain transistor 230 is controlled in response to a low conversion gain control signal LFG 242. As such, the LOFIC 232 is coupled between the bias voltage source 248 and the low conversion gain transistor 230 as well as between the bias voltage source 248 and the overflow transistor 254. Therefore, it is appreciated that the LOFIC 232 is selectively coupled to the first floating diffusion FD1 218 through the low conversion gain transistor 230, which are selectively coupled to the reset transistor 234 through the dual floating diffusion transistor 224. The LOFIC 232 is coupled to receive excess image charge overflow from photodiode 214 through the overflow transistor 254 during the integration period (e.g., under a bright light condition such as IR or LED light).

In the example, the LOFIC 232 is implemented with a metal-insulator-metal capacitor including a high dielectric or high-k insulating material disposed between a first metal electrode and a second metal electrode. In various examples, the insulating material disposed between the first metal electrode and the second metal electrode of the LOFIC 232 may be formed of a single layer of high-k material or a multiple layer stack of high-k material. The exact composition and an overall thickness of high-k material may depend on the desired LOFIC capacitance. In the various examples, high-k material may include one of aluminum oxide ($Al_2O_3$), Zirconium dioxide ($ZrO_2$), Hafnium oxide (HfO), or a combination thereof.

In one example, it is appreciated that the first metal electrode of LOFIC 232 may be referred to as a capacitor top metal (CTM) and the second metal electrode of LOFIC 232 may be referred to as a capacitor bottom metal (CBM).

In operation, the bias voltage source 248 is configured to provide a bias voltage VCAP to the drain of the reset transistor RST 234 as well as the first metal electrode CTM of the LOFIC 232. Furthermore, during the idle period as shown in the example depicted in FIG. 2A, the reset transistor RST 234 is configured to be turned on in response to the reset control signal RSTG 244, the dual floating diffusion transistor 224 is configured to be turned on in response to the dual floating diffusion control signal 238, and the low conversion gain transistor 230 is configured to be turned on in response to the low conversion gain control signal LFG 242. As such, the second metal electrode CBM of the LOFIC 232 is also coupled to the bias voltage source 248 through the first floating diffusion FD1 218 through the low conversion gain transistor 230 as well as through the dual floating diffusion transistor 224, which causes a special forced bias or auto-zero across LOFIC 232 during the idle period and therefore discharges the LOFIC 232 in accordance with the teachings of the present invention. In operation, both the first and second metal electrodes (e.g., CTM and CBM) of LOFIC 232 are therefore both locally short circuited together and to the same bias voltage source 248 through the reset transistor RST 234, the dual floating diffusion transistor 224, the first floating diffusion FD1 218, the transfer transistor 216, and the low conversion gain transistor 230 during the idle period in pixel circuit 204, which forces the LOFIC 232 to discharge, which reduces the image lag problem in accordance with the teachings of the present invention.

As shown in the example depicted in FIG. 2A, during the idle period, the bias voltage source 248 is configured to provide a bias voltage VCAP, which in various examples may have a value of a low capacitor bias voltage to a high capacitor bias voltage, which may also be referred to as VCAP_lo to VCAP_hi in this disclosure. In one example, bias voltage VCAP may have a value between 0V and 3.5V. It is appreciated that in the various examples, voltage level of bias voltage VCAP may be determined in consideration of the stable range of the high-k material. In the example, during the idle period, the reset control signal RSTG 244 may have a value sufficient to turn on reset transistor RST 234 e.g., a value between 2.5V to 4V, the dual floating diffusion control signal DFD 238 may have a high voltage value ranging between 2.5V to 4V, the low conversion gain control signal LFG 242 may have a value of 0V to 4V, the transfer control signal TX 236 may have a value of 0V to 3V, and the overflow control signal OFG 256 may have a negative voltage value (such as a value between −1V to −2V) to form a barrier that prevents any charges from flowing from the photodiode 214 to LOFIC 232. It is appreciated that with the overflow control signal OFG 256 having a negative voltage value during the idle period, the excess charge photogenerated in the photodiode 214 in response to bright light (e.g., IR or LED light) is configured not to flow into LOFIC 232, but instead overflow into the first floating diffusion FD1 218 through the transfer transistor 216, which is then drained out through the reset transistor 234 during the idle period. By configuring voltage level transfer control signal TX 236 to positive voltage or zero voltage, provides a leakage path for excess charges to overflow from photodiode 214 to the first floating diffusion FD1 218 and drained out through the reset transistor 234.

Figure 2B:
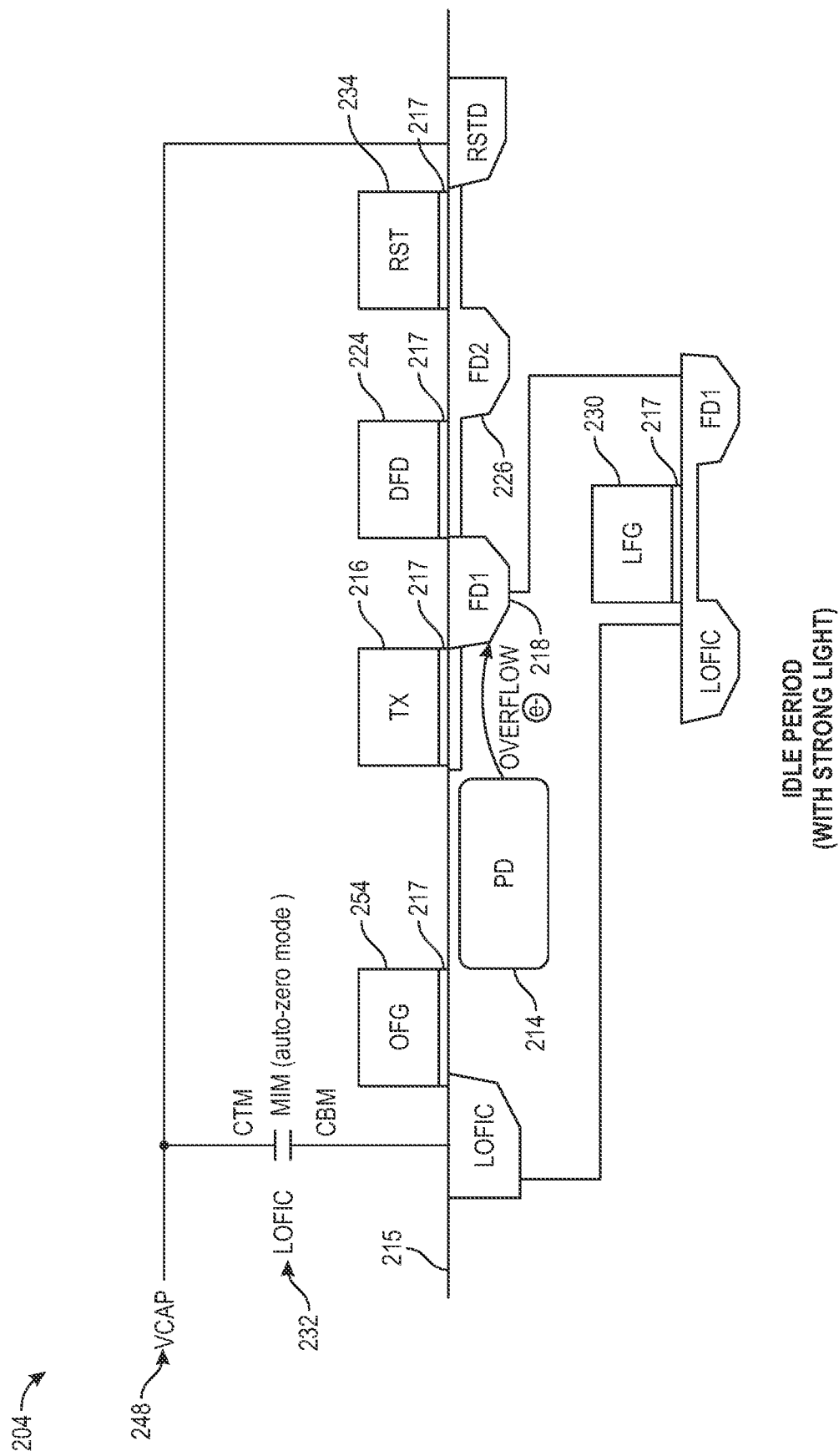
FIG. 2B illustrates a diagram representing a cross-section of one example of a pixel circuit including a lateral overflow integration capacitor (LOFIC) during an idle period in accordance with the teachings of the present disclosure.

FIG. 2B illustrates a diagram representing a cross-section of one example of a pixel circuit 204 including a lateral overflow integration capacitor (LOFIC) during an idle period in accordance with the teachings of the present disclosure. It is appreciated that the pixel circuit 204 of FIG. 2B may be an example of one of the pixel circuits 104 included in pixel array 102 as shown in FIG. 1, and that similarly named and numbered elements described above are coupled and function similarly below. It is also appreciated that the pixel circuit 204 depicted in FIG. 2B may be a cross-section example of the pixel circuit 204 depicted in FIG. 2A discussed in detail above.

For instance, as shown in the example depicted in FIG. 2B, a pixel circuit 204 includes a photodiode PD 214 disposed in semiconductor material 215 such as silicon, substrate, a silicon germanium alloy, germanium, a silicon carbide alloy, an indium gallium arsenide alloy, any other alloys formed of III-V compounds, other suitable semiconductor materials or alloys, combinations thereof, a bulk substrate thereof, or a wafer thereof. The photodiode 214 is configured to photogenerate image charge in response to incident light. In the depicted example, pixel circuit 204 also includes a first floating diffusion FD1 218 coupled to receive the image charge from the photodiode PD 214 through a transfer transistor 216. As will be further shown in the example depicted in FIG. 2E below, a transfer gate of transfer transistor 216 is configured to be coupled to a sufficiently low biasing voltage (e.g., a voltage between −2.0V to −0.5V), to strongly turn the transfer transistor 216 off during the integration period for accumulating photogenerated charges in photodiode 214 such that excess photogenerated charges from photodiode 214 in response to strong light overflow through overflow transistor 254 into the LOFIC 232. However, during an idle period as shown in FIG. 2B, transfer transistor 216 is coupled to a voltage (e.g., 0-2.7V volts) during the idle period providing a leakage path between photodiode 214 and first floating diffusion FD1 218 to prevent photogenerated charge from overflowing to LOFIC 232 such that no stress-induced MIM lag occurs during the idle period. The control biasing voltage (e.g., high biasing voltage, intermediate biasing voltage, or the low biasing voltage) biasing the transfer gate of transfer transistor 216 is provided by the transfer control signal TX 236.

In the example illustrated in FIG. 2B, a dual floating diffusion DFD transistor 224 is coupled between the first floating diffusion FD1 218 and a second floating diffusion FD2 226. The second floating diffusion FD2 may be coupled to a capacitor (e.g., second capacitor 228) providing additional charge storage. In the example, the gate of the dual floating diffusion transistor 224 is coupled to receive a high biasing voltage, for example in response to the dual floating diffusion control signal DFD 238 having high voltage level, such that the dual floating diffusion transistor 224 turns on during the idle period as shown. The high voltage level of dual floating diffusion control signal DFD 238 may be greater than the high biasing voltage applied to the transfer gate of transfer transistor 216. In one example, the high voltage level of dual floating diffusion control signal DFD 238 may range between 3 to 4 volts. A reset transistor 234 is coupled between a bias voltage source 248 and the dual floating diffusion transistor 224. The reset transistor 234 is turned on during the idle period, such that excess photogenerated charges may overflow to the first floating diffusion FD1 218, the second floating diffusion FD2 226, and drain out to the bias voltage source 248 through the reset transistor 234 as shown. In the example, the gate of the reset transistor 234 is coupled to receive a high biasing voltage, for example in response to the reset control signal RSTG 244 having high voltage level. In one example, the high voltage level of the reset control signal RSTG 244 may range between 3 to 4 volts.

As shown in the example depicted in FIG. 2B, an overflow transistor 254 is coupled to photodiode 214, and a LOFIC 232 is coupled between the bias voltage source 248 and the overflow transistor 254. In the example, the gate of the overflow transistor 254 coupled to receive a negative biasing voltage, e.g., the overflow control signal OFG 256 having a low voltage level, such that the overflow transistor 254 operates in an off state and disable any charge flow path between the photodiode 214 and LOFIC 232. The low or negative biasing voltage level of the overflow control signal OFG 256 may range between −1V to −2V. In the example, a low conversion gain transistor 230 is coupled between the LOFIC 232 and the first floating diffusion FD1 218. In the example, the gate of the low conversion gain transistor 230 is coupled to receive a high biasing voltage, for example, low conversion gain control signal LFG 242 having a high voltage level during idle period such that low conversion gain transistor 230 turns on as shown. As such, the LOFIC 232 is coupled between the bias voltage source 248 and the low conversion gain transistor 230 as well as between the bias voltage source 248 and the overflow transistor 254.

Therefore, it is appreciated that the LOFIC 232 is selectively coupled to the first floating diffusion FD1 218 through the low conversion gain transistor 230, which are selectively coupled to the reset transistor 234 through the dual floating diffusion transistor 224 and the second floating diffusion FD2 226.

In operation, the bias voltage source 248 is configured to provide a bias voltage VCAP to the drain RSTD of the reset transistor RST 234 as well as the first metal electrode CTM of the LOFIC 232. Furthermore, during the idle period as shown in the example depicted in FIG. 2B, the reset transistor RST 234 is configured to be turned on with high biasing voltage received by the gate of the reset transistor 234, the dual floating diffusion transistor 224 is configured to be turned on in response to the high biasing voltage received by the gate of the dual floating transistor 224, and the low conversion gain transistor 230 is configured to be turned on in response to high biasing voltage received by the gate of the low conversion gain transistor 234. As such, the second metal electrode CBM of the LOFIC 232 is also coupled to the bias voltage source 248 through the first floating diffusion FD1 218 through the low conversion gain transistor 230 as well as through the dual floating diffusion transistor 224, which causes a special forced bias or autozero across LOFIC 232 during the idle period and therefore discharges the LOFIC 232 in accordance with the teachings of the present invention. In operation, both the first and second metal electrodes (e.g., CTM and CBM) of LOFIC 232 are therefore both locally short circuited together and to the same bias voltage source 248 through the reset transistor RST 234, the second floating diffusion FD2 226, the dual floating diffusion transistor 224, the first floating diffusion FD1 218, and the low conversion gain transistor 230 during the idle period in pixel circuit 204, which forces the LOFIC 232 to discharge, which mitigate the image lag problem in accordance with the teachings of the present invention. It is appreciated that with the gate of the overflow transistor 254 receiving sufficient negative biasing voltage while the transfer gate of the transfer transistor 216 receives a bias voltage that is greater than the bias applied to the gate of overflow transistor 254, such as zero bias voltage or positive bias voltage, providing a leakage path between the photodiode 214 and first floating diffusion FD1 218 during the idle period, such that the excess charge photogenerated in the photodiode 214 in response to bright light (e.g., IR or LED light) is configured not to flow into LOFIC 232, but instead overflow into the first floating diffusion FD1 218 through the transfer transistor 216, which is then drained out through the reset transistor 234 during the idle period.

In the example illustrated in FIG. 2B, it is noted that a gate oxide layer 217 is disposed between the gate electrodes of the overflow transistor 254, transfer transistor 216, dual floating diffusion transistor 224, reset transistor 234, and low conversion gain transistor 230 and the surface of semiconductor material 215.

Figure 2C:
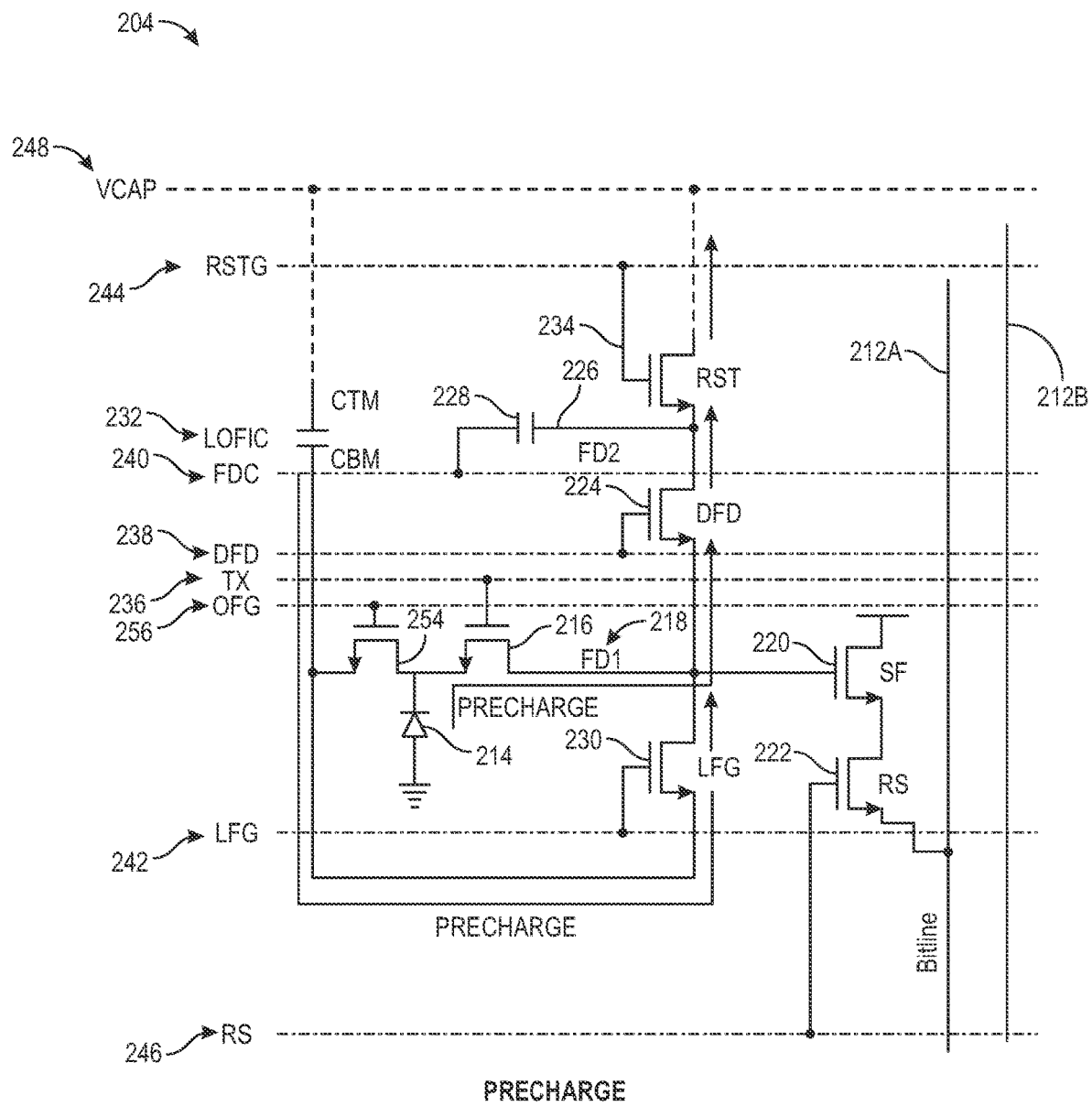
FIG. 2C illustrates a schematic of one example of a pixel circuit including a LOFIC during a precharge period in accordance with the teachings of the present disclosure.

FIG. 2C illustrates a schematic of one example of a pixel circuit 204 including a LOFIC during a precharge period in accordance with the teachings of the present disclosure. It is appreciated that the pixel circuit 204 of FIG. 2C may be an example of one of the pixel circuits 104 included in pixel array 102 as shown in FIG. 1, and that similarly named and numbered elements described above are coupled and function similarly below. It is also appreciated that the pixel circuit 204 depicted in FIG. 2C is substantially similar to the pixel circuit 204 depicted in FIGS. 2A-2B discussed in detail above, except that the pixel circuit 204 illustrated in FIG. 2C is depicted during a precharge period, which occurs after the idle period illustrated in FIG. 2A and before an integration period and readout period.

To illustrate, FIG. 2C shows that pixel circuit 204 includes a photodiode 214 that is configured to photogenerate image charge in response to incident light. In the depicted example, pixel circuit 204 also includes a first floating diffusion FD1 218 coupled to receive the image charge from the photodiode 214 through a transfer transistor 216. In the example, the transfer transistor 216 is coupled to be controlled in response to a transfer control signal TX 236 to transfer image charge from the photodiode 214 to the first floating diffusion FD1 218. A source follower transistor 220 has a gate coupled to the first floating diffusion FD1 218, and a row select transistor 222 is coupled to the source follower transistor SF 220 such that the source follower transistor 220 and the row select transistor 222 are coupled between a power line and a bitline 212 to output an image signal from the pixel circuit 204 in response to a row select control signal RS 246 and the amount of charge at the gate of the source follower transistor 220.

In the example illustrated in FIG. 2C, a dual floating diffusion DFD transistor 224 is coupled between the first floating diffusion FD1 218 and a second capacitor 228. The drain of the dual floating diffusion DFD transistor 224 that is coupled to the second capacitor 228 may also be referred to as a second floating diffusion FD2 226. The second capacitor 228 has one end coupled to a source of the reset transistor, and the other coupled to receive a floating diffusion capacitor signal FDC 240 for facilitating charge transfer during a readout period occurring after the integration period. The reset transistor 234 is coupled between a bias voltage source 248 and the dual floating diffusion transistor 224. The dual floating diffusion transistor 224 is coupled to be controlled in response to a dual floating diffusion control signal DFD 238 and the reset transistor 234 is coupled to be controlled in response to a reset control signal RSTG 244.

As shown in the example depicted in FIG. 2C, an overflow transistor 254 is coupled to photodiode 214, and LOFIC 232 is coupled between the bias voltage source 248 and the overflow transistor 254. In the example, the overflow transistor 254 is controlled in response to an overflow control signal OFG 256. In the example, a low conversion gain transistor 230 is coupled between the LOFIC 232 and the first floating diffusion FD1 218. In the example, the low conversion gain transistor 230 is controlled in response to a low conversion gain control signal LFG 242. As such, the LOFIC 232 is coupled between the bias voltage source 248 and the low conversion gain transistor 230 as well as between the bias voltage source 248 and the overflow transistor 254. Therefore, it is appreciated that the LOFIC 232 is selectively coupled to the first floating diffusion FD1 218 through the low conversion gain transistor 230, which are selectively coupled to the reset transistor 234 through the dual floating diffusion transistor 224 and the second capacitor 228.

In operation, the bias voltage source 248 is configured to provide a bias voltage VCAP to the drain of the reset transistor RST 234 as well as the first metal electrode CTM of the LOFIC 232. Furthermore, during the precharge period as shown in the example depicted in FIG. 2C, the reset transistor RST 234 is configured to be turned on in response to the reset control signal RSTG 244 (e.g., the reset control signal RSTG 244 having high voltage level), the dual floating diffusion transistor 224 is configured to be turned on in response to the dual floating diffusion control signal 238 (e.g., the dual floating diffusion control signal 238 having high voltage level), and the low conversion gain transistor 230 is configured to be turned on in response to the low conversion gain control signal LFG 242 (e.g., the low conversion gain control signal LFG 242 having high voltage level). As such, the second metal electrode CBM of the LOFIC 232 is also coupled to the bias voltage source 248 through the first floating diffusion FD1 218 through the low conversion gain transistor 230 as well as through the dual floating diffusion transistor 224, which causes a special forced bias or auto-zero across LOFIC 232 during the precharge period and therefore discharges the LOFIC 232 in accordance with the teachings of the present invention. In operation, both the first and second metal electrodes (e.g., CTM and CBM) of LOFIC 232 are therefore both locally short circuited together and to the same bias voltage source 248 through the reset transistor RST 234, the dual floating diffusion transistor 224, the first floating diffusion FD1 218, and the low conversion gain transistor 230 during the precharge period in pixel circuit 204, which forces the LOFIC 232 to discharge, which reduces the image lag problem in accordance with the teachings of the present invention. In the depicted example, it is noted that the transfer transistor 216 is also turned on during the precharge period, which also couples the photodiode 214 to the first floating diffusion FD1 218, and therefore to the bias voltage source 248 during the precharge period to reset the photodiode 214 during the precharge period. The first floating diffusion FD1 218 and the second capacitor 228 are also coupled to the bias voltage source 248 during the precharge period and reset as well (e.g., draining out residual charges to the bias voltage source 248)

As shown in the example depicted in FIG. 2C, during the precharge period, the bias voltage source 248 is configured to provide a bias voltage VCAP equal to VCAP_hi, the reset control signal RSTG 244 may have a high voltage value that may range between 2.5V to 4V, the dual floating diffusion control signal DFD 238 may have a high voltage value that may range between 2.5V to 4V, the low conversion gain control signal LFG 242 may have a high voltage value that may range between 2.5V to 4V, the transfer control signal TX 236 may have a high voltage value that may range from 2.5V to 3.5V, and the overflow control signal OFG 256 may have a low voltage value that may range from −1V to −2V.

Figure 2D:
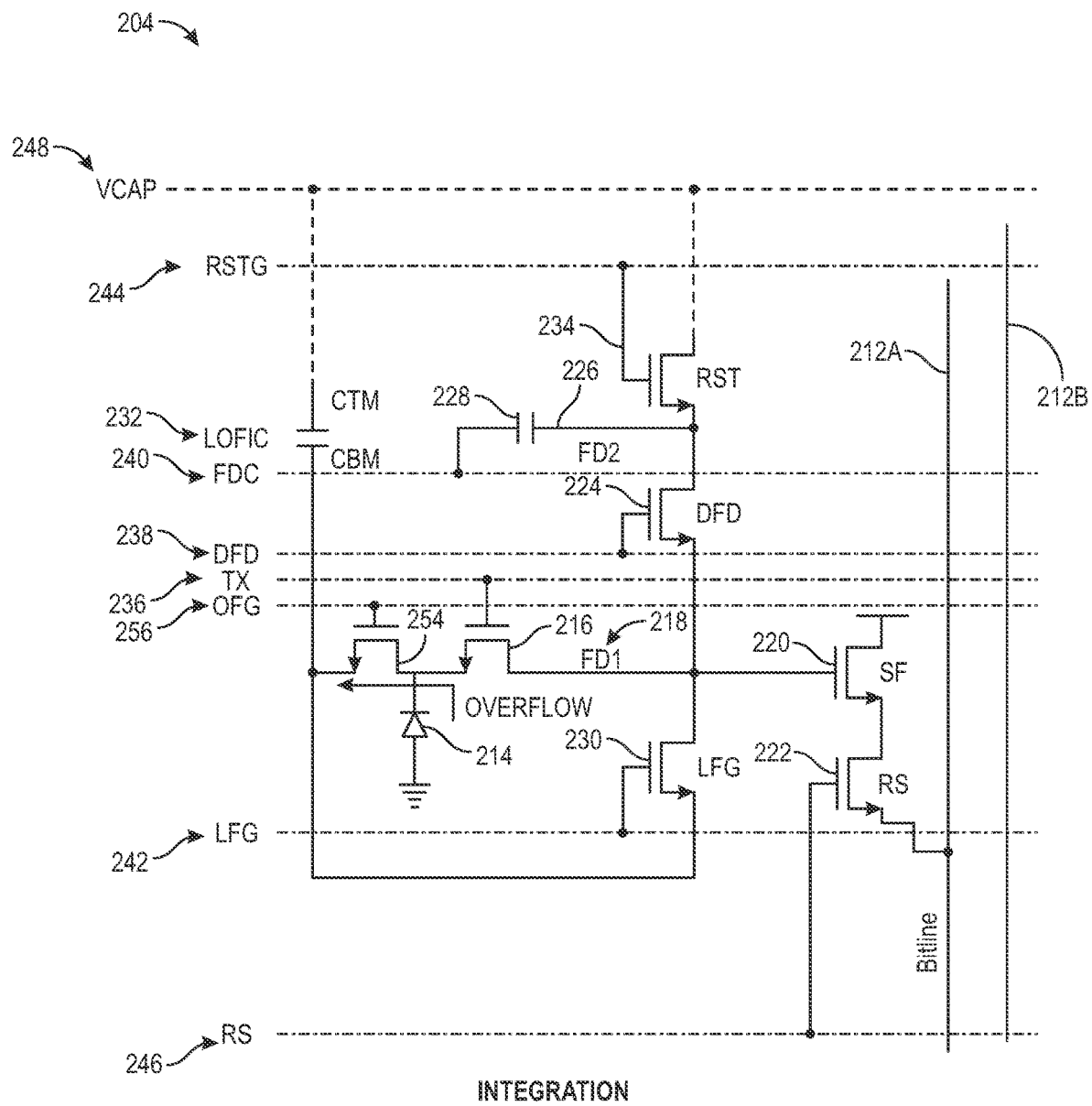
FIG. 2D illustrates a schematic of one example of a pixel circuit including a lateral overflow integration capacitor (LOFIC) during an integration period in accordance with the teachings of the present disclosure.

FIG. 2D illustrates a schematic of one example of a pixel circuit 204 including a LOFIC during an integration period in accordance with the teachings of the present disclosure. It is appreciated that the pixel circuit 204 of FIG. 2D may be an example of one of the pixel circuits 104 included in pixel array 102 as shown in FIG. 1, and that similarly named and numbered elements described above are coupled and function similarly below. It is also appreciated that the pixel circuit 204 depicted in FIG. 2D is substantially similar to the pixel circuit 204 depicted in FIGS. 2A-2C discussed in detail above, except that the pixel circuit 204 illustrated in FIG. 2D is depicted during an integration period, which occurs after the precharge period illustrated in FIG. 2C and before the readout period.

To illustrate, FIG. 2D shows that pixel circuit 204 includes a photodiode 214 that is configured to photogenerate image charge in response to incident light. In the depicted example, pixel circuit 204 also includes a first floating diffusion FD1 218 coupled to receive the image charge from the photodiode 214 through a transfer transistor 216. In the example, the transfer transistor 216 is coupled to be controlled in response to a transfer control signal TX 236 to transfer image charge from the photodiode 214 to the first floating diffusion FD1 218. A source follower transistor 220 has a gate coupled to the first floating diffusion FD1 218, and a row select transistor 222 is coupled to the source follower transistor SF 220 such that the source follower transistor 220 and the row select transistor 222 are coupled between a power line and a bitline 212 to output an image signal from the pixel circuit 204 in response to a row select control signal RS 246 and the amount of charge at the gate of the source follower transistor 220.

In the example illustrated in FIG. 2D, a dual floating diffusion DFD transistor 224 is coupled between the first floating diffusion FD1 218 and a second capacitor 228. The drain of the dual floating diffusion DFD transistor 224 that is coupled to the second capacitor 228 may also be referred to as a second floating diffusion FD2 226. The second capacitor 228 is coupled to receive a floating diffusion capacitor signal FDC 240 for facilitating charge readout. The reset transistor 234 is coupled between a bias voltage source 248 and the dual floating diffusion transistor 224. The dual floating diffusion transistor 224 is coupled to be controlled in response to a dual floating diffusion control signal DFD 238 and the reset transistor 234 is coupled to be controlled in response to a reset control signal RSTG 244.

As shown in the example depicted in FIG. 2D, an overflow transistor 254 is coupled to photodiode 214, and LOFIC 232 is coupled between the bias voltage source 248 and the overflow transistor 254. In the example, the overflow transistor 254 is controlled in response to an overflow control signal OFG 256. In the example, a low conversion gain transistor 230 is coupled between the LOFIC 232 and the first floating diffusion FD1 218. In the example, the low conversion gain transistor 230 is controlled in response to a low conversion gain control signal LFG 242. As such, the LOFIC 232 is coupled between the bias voltage source 248 and the low conversion gain transistor 230 as well as between the bias voltage source 248 and the overflow transistor 254. Therefore, it is appreciated that the LOFIC 232 is selectively coupled to the first floating diffusion FD1 218 through the low conversion gain transistor 230, which are selectively coupled to the reset transistor 234 through the dual floating diffusion transistor 224. In operation, the bias voltage source 248 is configured to provide a bias voltage VCAP to the drain of the reset transistor RST 234 as well as the first metal electrode CTM of the LOFIC 232.

In the depicted example, the transfer transistor 216, the overflow transistor 254, and the low conversion gain transistor 230 are configured to be turned off in response to the transfer control signal TX 236, the overflow control signal OFG 256, and the low conversion gain control signal LFG 242, respectively during the integration period. As such, it is appreciated that the LOFIC 232 is in a charge storing mode during integration. For instance, as shown in the example depicted in FIG. 2D, during the integration period, the bias voltage source 248 is configured to provide a bias voltage VCAP equal to VCAP_lo (e.g., 1 to 2V), the reset control signal RSTG 244 may have a value of 0V, the dual floating diffusion control signal DFD 238 may have a value of 0V, the low conversion gain control signal LFG 242 may have a value of 0V, the transfer control signal TX 236 may have a low voltage value (e.g., negative biasing signal ranging between −1V to −2V, and the overflow control signal OFG 256 may have a negative voltage value in range of −1V to −2V. In the depicted example, it is appreciated that the transfer transistor 216 and the overflow transistor 254 are biased such that excess image charge photogenerated by photodiode 214 during the integration period in response to bright light overflows through the overflow transistor 254 to the LOFIC 232 instead of through the transfer transistor 216 to the first floating diffusion FD1 218. It is appreciated that the overflow transistor 254 may be configured to be leakier than the transfer transistor 216. In one example, the overflow transistor 254 is configured with an additional n-type channel implant (e.g., implant having same conductive type as the photodiode 214) underneath the gate of overflow transistor 254 proximate to associated channel region such that the excess image charge overflows or leaks from the photodiode 214 through the overflow transistor 254 to the LOFIC 232 during the integration period.

Figure 2E:
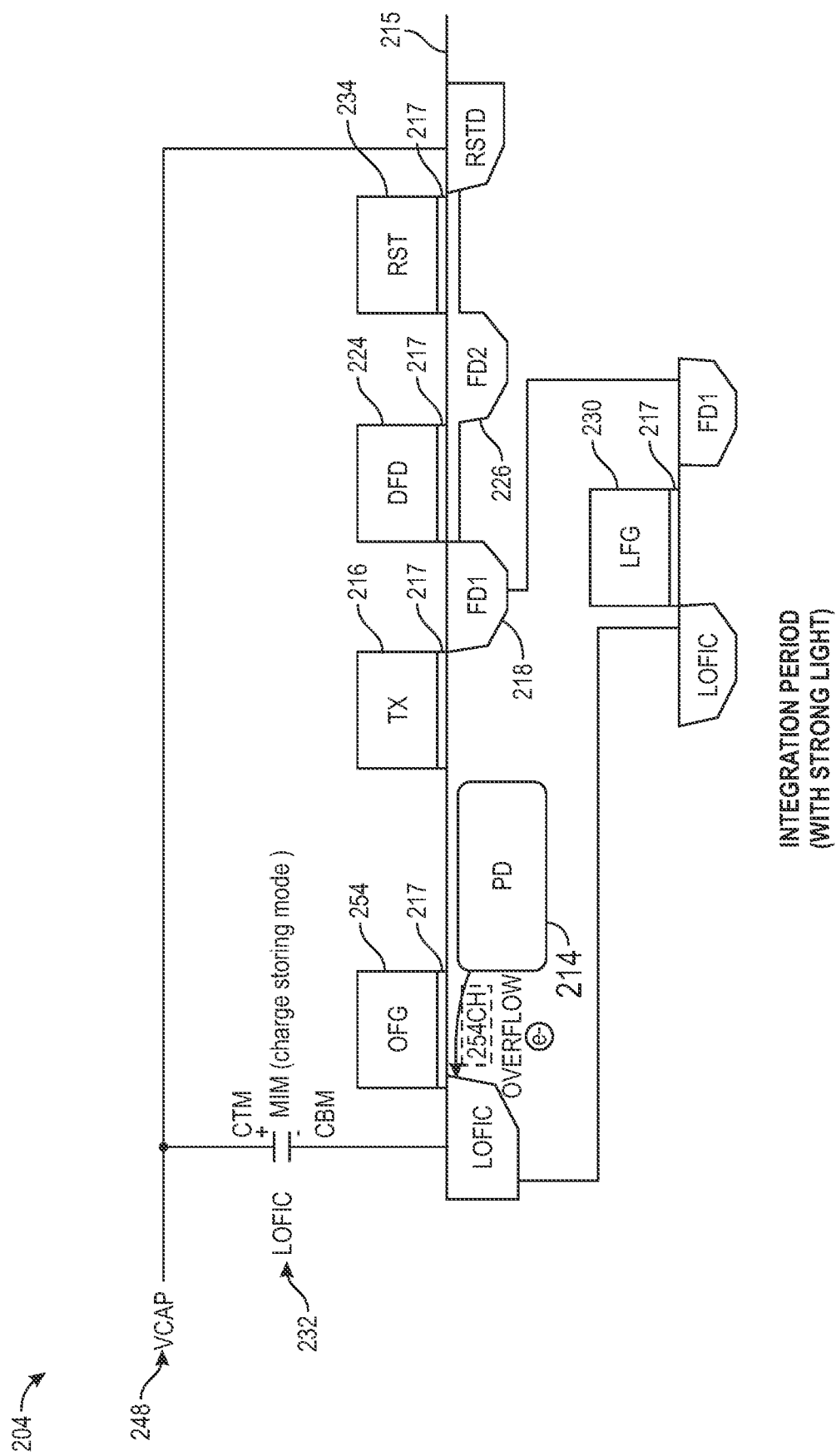
FIG. 2E illustrates a diagram representing a cross-section of one example of a pixel circuit including a lateral overflow integration capacitor (LOFIC) during an integration period in accordance with the teachings of the present disclosure.

To illustrate, FIG. 2E illustrates a diagram representing a cross-section of one example of a pixel circuit 204 including a lateral overflow integration capacitor (LOFIC) during an integration period with bright light in accordance with the teachings of the present disclosure. It is appreciated that the pixel circuit 204 of FIG. 2E may be an example of one of the pixel circuits 104 included in pixel array 102 as shown in FIG. 1, and that similarly named and numbered elements described above are coupled and function similarly below. It is also appreciated that the pixel circuit 204 depicted in FIG. 2E may be a cross-section example of the pixel circuit 204 during an integration period with bright light as depicted in FIG. 2D discussed in detail above.

For instance, as shown in the example depicted in FIG. 2E, a pixel circuit 204 includes a photodiode PD 214 disposed in semiconductor material 215 such as silicon, which is configured to photogenerate image charge in response to incident light. In the depicted example, pixel circuit 204 also includes a first floating diffusion FD1 218 coupled to receive the image charge from the photodiode PD 214 through a transfer transistor 216. In the example, the gate of transfer transistor 216 is configured to be coupled to receive a negative biasing voltage −1.4V during the integration period as shown, which turns off the transfer transistor 216 as shown.

In the example illustrated in FIG. 2E, a dual floating diffusion DFD transistor 224 is coupled between the first floating diffusion FD1 218 and a second floating diffusion FD2 226. In the example, the gate of the dual floating diffusion 224 is coupled to receive a high biasing voltage (that may range between 2.5V to 3.5V) during the integration period as shown. A reset transistor 234 is coupled between a bias voltage source 248 and the dual floating diffusion transistor 224. In the example, the gate of the reset transistor 234 is coupled to receive a high voltage ranging between 2.5V to 4V during the integration period as shown.

As shown in the example depicted in FIG. 2E, an overflow transistor 254 is coupled to photodiode 214, and a LOFIC 232 is coupled between the bias voltage source 248 and the overflow transistor 254. In the example, the gate of the overflow transistor 254 coupled to receive a negative voltage (e.g., a value between −1V to −2V during the integration period, which turns off the overflow transistor 254 but the overflow transistor 254 is configured to provide an off-leakage path (e.g., with addition channel implant 254CH) between the photodiode 214 and the LOFIC 232 as shown. In the example, a low conversion gain transistor 230 is coupled between the LOFIC 232 and the first floating diffusion FD1 218. In the example, the gate of the low conversion gain transistor 230 is coupled to receive a low biasing voltage of 0V during the integration period, which turns off the low conversion gain transistor 230 as shown.

As such, it is appreciated that the LOFIC 232 is in a charge storing mode during integration. As mentioned, in one example, it is appreciated that the overflow transistor 254 may be configured with an additional n-type channel implant (e.g., channel implant 254CH) disposed underneath a gate of the overflow transistor 254 between the photodiode 214 and the LOFIC 232 such that the excess image charge overflows or leaks from the photodiode 214 through the overflow transistor 254 to the LOFIC 232 during the integration period as shown.

In the example illustrated in FIG. 2E, it is noted that a gate oxide layer 217 is disposed between the gate electrodes of the overflow transistor 254, transfer transistor 216, dual floating diffusion transistor 224, reset transistor 234, and low conversion gain transistor 230 and the surface of semiconductor material 215.

Figure 3:
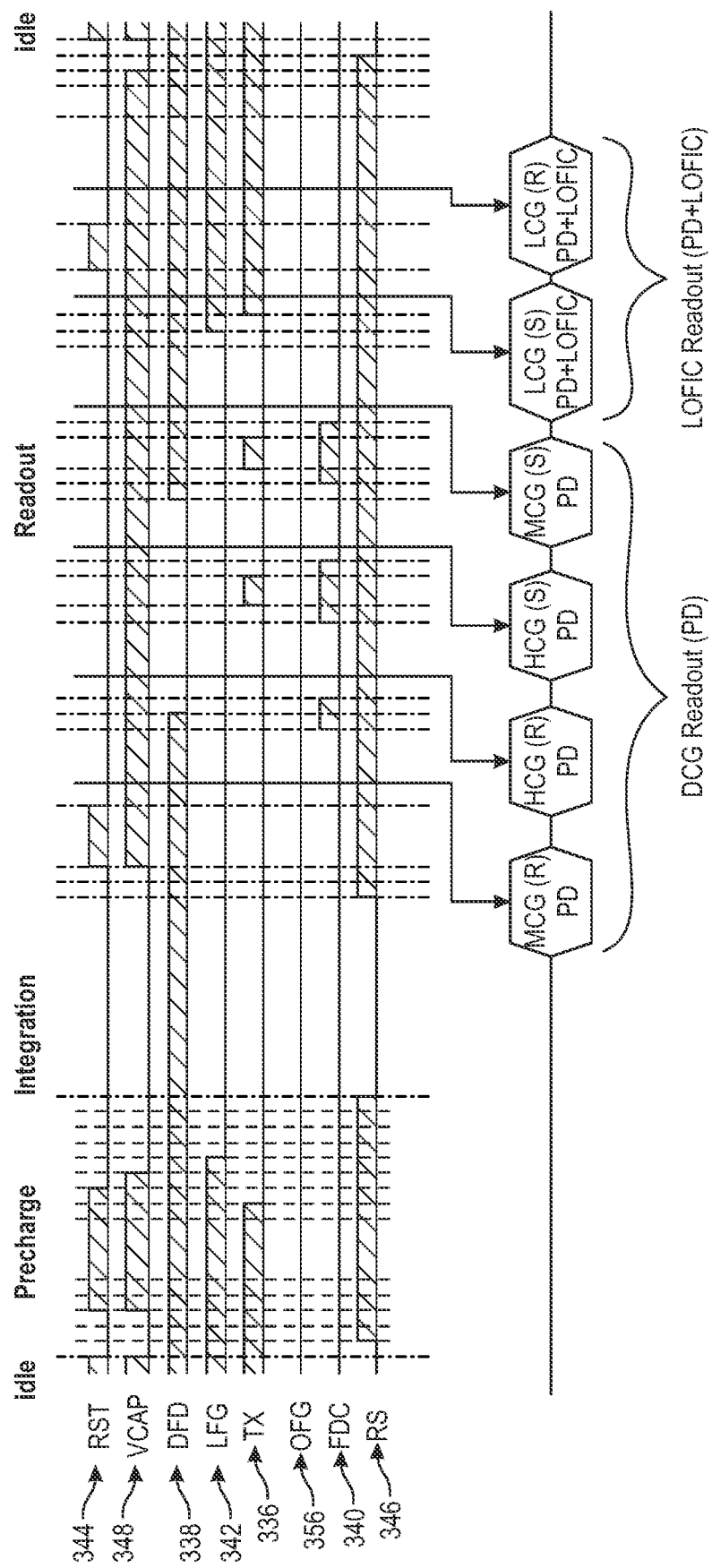
FIG. 3 illustrates one example of a timing diagram of example signal values in an example pixel circuit including a LOFIC during idle, precharge, integration, and readout periods in accordance with the teachings of the present disclosure.

FIG. 3 illustrates one example of a timing diagram of example signal values in an example pixel circuit including a LOFIC during idle, precharge, integration, and readout periods in accordance with the teachings of the present disclosure. It is appreciated that the signals depicted in FIG. 3 may be examples of the signals depicted in FIGS. 2A-2E for controlling the operation of the example pixel circuit such as pixel circuit 204, and that similarly named and numbered elements described above are coupled and function similarly below.

Referring now to the depicted example, FIG. 3 illustrates a reset control signal RST 344, a bias voltage VCAP 348, a dual floating diffusion control signal DFD 338, a low conversion gain control signal LFG 342, a transfer control signal TX 336, an overflow control signal OFG 356, a floating diffusion capacitor signal FDC 340, and a row select control signal RS 346, which are configured to control the respective circuit elements discussed in detail above in FIGS. 2A-2E. The example depicted in FIG. 3 also illustrates the idle, precharge, integration, and readout periods that the pixel circuit cycles through in order when generating image data.

As shown during the idle period depicted in FIG. 3, the reset control signal RST 344 turns on the reset transistor 234, and the bias voltage VCAP 348 provided by a bias voltage source 248 is equal to a high value (e.g., VCAP_hi), which is coupled to the first metal electrode CTM of the LOFIC 232 and the drain of the reset transistor 234. The dual floating diffusion control signal DFD 338 turns on the dual floating diffusion transistor 224, which therefore couples the first floating diffusion FD1 218 to receive the bias voltage VCAP 348 through the reset transistor 234. The low conversion gain control signal LFG 342 with high voltage level turns on the low conversion gain transistor 230, which couples the second metal electrode CBM of the LOFIC 232 to the first floating diffusion FD1 218. Therefore, it is appreciated that the both the first and second metal electrodes CTM and CBM of the LOFIC 232 are coupled to the bias voltage VCAP 348 through the reset transistor 234, the dual floating diffusion transistor 224, the first floating diffusion FD1 218, and the low gain conversion transistor 230 during the idle period in accordance with the teachings of the present invention. By short circuiting both the first and second metal electrodes CTM and CBM of the LOFIC 232 to the bias voltage VCAP 348, the LOFIC 232 is locally auto-zeroed or the initiation of a discharge operation of the LOFIC 232 is forced within pixel circuit 204, which reduces image lag in accordance with the teachings of the present invention. The illustrated example also shows that the transfer control signal TX 336 turns on the transfer transistor 216 and that the overflow control signal OFG 356 turns off the overflow transistor 254 during the idle period. In one example, it is appreciated that the overflow transistor 254 is negatively biased while the transfer control signal TX turns on the transfer transistor 216 or configuring the transfer gate 216 to be more leakier than the overflow transistor 254 in the idle period, which prevents excess image charge photogenerated by the photodiode 214 during the idle period from flowing into the LOFIC 232. Instead, the excess image charge photogenerated by the photodiode 214 during the idle period in response to strong light flows through the transfer transistor 216 to the first floating diffusion FD1 218, which is then drained out through the reset transistor 234 during the idle period.

The example depicted in FIG. 3 shows that during the precharge period, which occurs after the idle period, the dual floating diffusion control signal DFD 338, the low conversion gain control signal LFG 342, and the transfer control signal TX 336 remain on. Next, the row select signal RS 346 turns on the row select transistor 222, and then the reset control signal 344 turns on and the bias voltage VCAP 348 transitions to a high capacitor bias value (e.g., VCAP_hi). As such, it is appreciated that the both the first and second metal electrodes CTM and CBM of the LOFIC 232 are coupled to the high bias voltage provided by the bias voltage VCAP 348 through the reset transistor 234, the dual floating diffusion transistor 224, the first floating diffusion FD1 218, and the low gain conversion transistor 230 during the precharge period in accordance with the teachings of the present invention. By continuing to short circuiting both the first and second metal electrodes CTM and CBM of the LOFIC 232 to the bias voltage VCAP 348, the LOFIC 232 is locally auto-zeroed or discharged, which reduces image lag in accordance with the teachings of the present invention. In addition, it is appreciated that the photodiode 214 and the first floating diffusion FD1 218 are also discharged through the transfer transistor 216 and through the first floating diffusion FD1 218, the dual floating diffusion transistor 224, the reset transistor 234, and reset to the high bias voltage provided by the bias voltage VCAP 348 during the precharge period.

Afterwards, the transfer control signal TX 336 turns off the transfer transistor 216, and then the reset control signal RST 344 turns off the reset transistor 234, and then the bias voltage source 348 transitions to the low capacitor bias value or VCAP_lo (e.g., 0 volts), and then the low conversion gain control signal LFG 342 transition to low voltage level turning off the low conversion gain transistor 230, and then the row select signal RS 346 turns off the row select transistor 222.

The example depicted in FIG. 3 shows that during the integration period, which occurs after the precharge period, all of the signals are low, except the dual floating diffusion control signal 338 which remains high, and integration occurs, during which time the photodiode 214 generates image charge in response to incident light.

The example depicted in FIG. 3 shows that during the readout period, which occurs after the integration period, the dual floating diffusion control signal DFD 338 remains high and the row select signal RS 346 turns on the row select transistor 222. Next, the reset control signal 344 turns in the reset transistor 234 and the bias voltage VCAP 348 transitions to a high capacitor bias value (e.g., VCAP_hi). In the example, the floating diffusion capacitor signal FDC 340 may be pulsed to adjusting biasing across the second capacitor 226 and voltage of the first floating diffusion FD1 218 to facilitate signal readout from the photodiode 218 during the operation of high conversion gain and medium conversion gain signal readout.

Next, a dual conversion gain (DCG) readout of the photodiode occurs during which time the reset control signal RST 344 transitions to a low value and then a medium conversion gain (MCG) readout of a reset value (R) from the photodiode 214 occurs. Next, the floating diffusion capacitor signal FDC 340 is pulsed while the dual floating diffusion control signal DFD 338 turns off the dual floating diffusion transistor 224. Next, a high conversion gain (HCG) readout of a reset value (R) from the photodiode 214 occurs. Next, the floating diffusion capacitor signal FDC 340 transitions to a high value, and the transfer control signal TX 336 turns on the transfer transistor 216, during which time image charge in the photodiode 214 transfers to the first floating diffusion FD1 218. Next, a high conversion gain (HCG) readout of a signal value (S) may occur after the transfer control signal TX 236 and the floating diffusion capacitor signal FDC 340 transition to a low value. Next, the dual floating diffusion control signal DFD 338 turns on the dual floating diffusion transistor 224, the floating diffusion capacitor signal FDC 340 transitions to a high value, and the transfer control signal TX 336 turns on the transfer transistor 216, during which time image charge in the photodiode 214 transfers to the first floating diffusion FD1 218, and the second capacitor 228. Next, a medium conversion gain (MCG) readout of a signal value (S) may occur after the transfer control signal TX 236 and the floating diffusion capacitor signal FDC 340 transition to a low value.

Next, a LOFIC readout of the photodiode 214 and the LOFIC 232 occurs, during which time the low conversion gain control signal LFG 342 turns on the low conversion gain transistor 230, and then the transfer control signal TX 336 turns on the transfer transistor 216, during which time image charge in the photodiode 214 transfers to the first floating diffusion FD1 218, the second capacitor 228, and the LOFIC 232. Next, a low conversion gain (LCG) readout of a signal value (S) may occur. Next, the reset control signal RST 344 turns on the reset transistor 234, during which time the photodiode 214, the first floating diffusion FD1 218, the second capacitor 228, and the LOFIC 232 are all reset through the reset transistor 234, the second floating diffusion FD2 226, the dual floating diffusion transistor 224, the first floating diffusion FD1 218, the transfer transistor 216, and the low gain conversion transistor 230 with the bias voltage VCAP 348 set to the high capacitor bias value (e.g., VCAP_hi). Next, the reset transistor 234 is turned off and then a low conversion gain (LCG) readout of a reset value (R) occurs.

Next, the process described in FIG. 3 cycles back to an idle period, during which time the LOFIC 232 may be auto-zeroed or discharged again to reduce image lag and the cycle repeats in accordance with the teachings of the present invention.

Figure 4A:
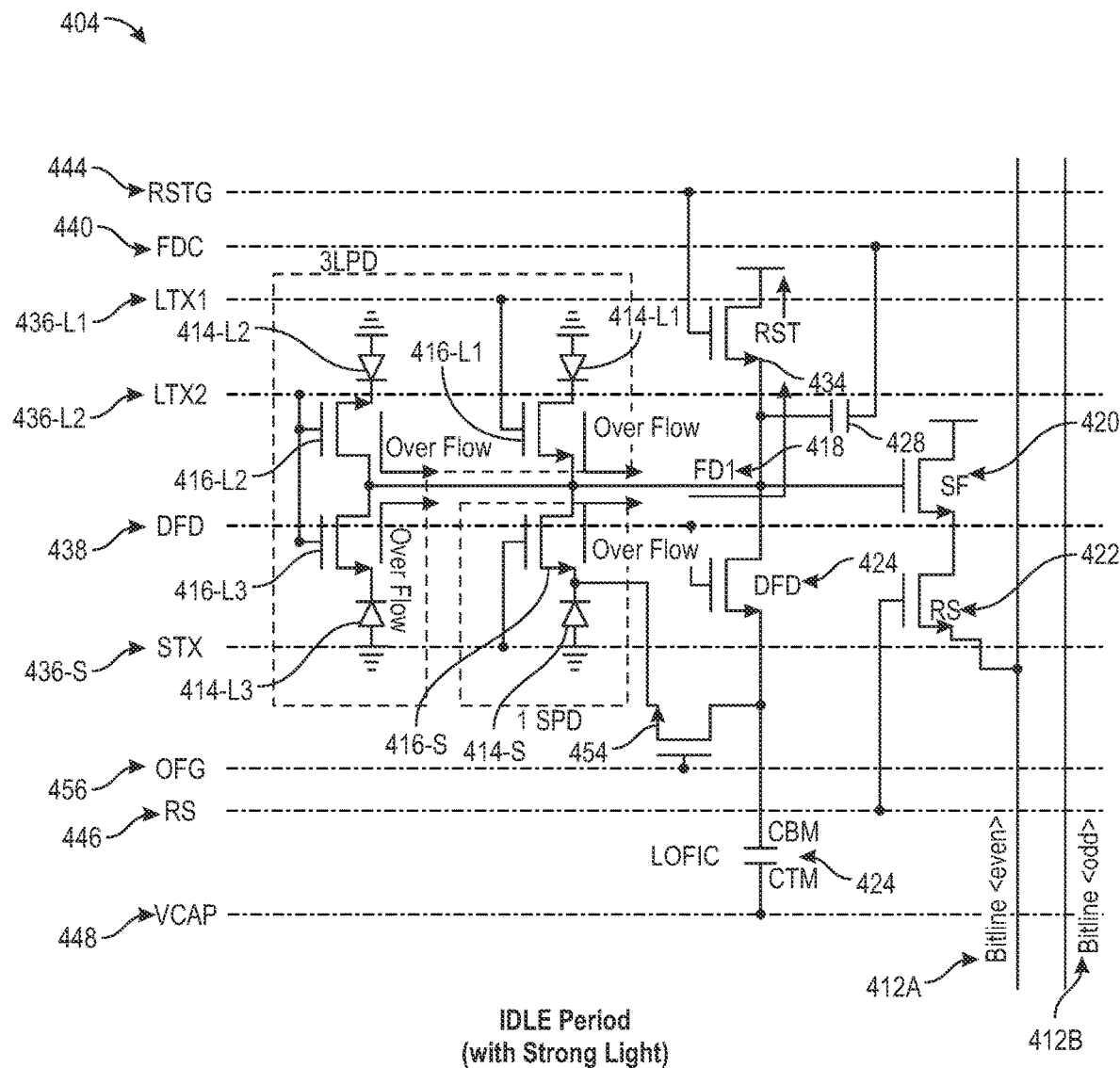
FIG. 4A illustrates a schematic of another example of a pixel circuit including a lateral overflow integration capacitor (LOFIC) during an idle period in accordance with the teachings of the present disclosure.

FIG. 4A illustrates a schematic of another example of a pixel circuit 404 including a lateral overflow integration capacitor (LOFIC) during an idle period in accordance with the teachings of the present disclosure. It is appreciated that the pixel circuit 404 of FIG. 4A may be an example of one of the pixel circuits 104 included in pixel array 102 as shown in FIG. 1, and that similarly named and numbered elements described above are coupled and function similarly below. It is also appreciated that the pixel circuit 404 depicted in FIG. 4A shares some similarities with pixel circuit 204 depicted in FIGS. 2A-2E discussed in detail above.

For instance, as shown in the example depicted in FIG. 4A, pixel circuit 404 includes a plurality of photodiodes that are configured to photogenerate image charge in response to incident light. In the depicted example, the plurality of photodiodes includes a grouping of photodiodes 414-L1, 414-L2, and 414-L3 that are configured to function collectively as a large photodiode with three photodiodes (e.g., 3 LPD). In addition, the plurality of photodiodes also includes a photodiode 414-S that is configured to function individually as a small photodiode (e.g., 1 SPD). In some embodiments, the large photodiode may have greater sensitivity to incident light than the small photodiode. In the depicted example, pixel circuit 404 also includes a first floating diffusion FD1 418 coupled to receive the image charge from the photodiodes 414-L1, 414-L2, 414-L3, and 414-S through a transfer transistors 416-S, 416-L1, 416-L2, and 414-L3, respectively. In the example, the transfer transistors 416-S, 416-L1, 416-L2, and 414-L3 are coupled to be controlled in response to a transfer control signals LTX1 436-L1, LTX2 436-L2, LTX3 436-L3, and STX 436-S, respectively, to transfer image charge from the photodiodes 414-L1, 414-L2, 414-L3, and 414-S to the first floating diffusion FD1 418. A source follower transistor 420 has a gate coupled to the first floating diffusion FD1 418, and a row select transistor 422 is coupled to the source follower transistor SF 420 such that the source follower transistor 420 and the row select transistor 422 are coupled between a power line and a bitline 412A to output an image signal from the pixel circuit 404 in response to a row select control signal RS 446 and the amount of charge at the gate of the source follower transistor 420. In one example, it is noted that pixel circuits 404 that are included in even rows may be coupled to bitline 412A while pixel circuits 404 that are included in odd rows may be coupled to bitline 412B.

In the depicted example, a second capacitor 428 is coupled to the first floating diffusion FD1 418 and is coupled to receive a floating diffusion capacitor signal FDC 440. The second capacitor 428 may be a junction capacitor combined with metal capacitor or metal oxide semiconductor capacitor (MOSCAP) for additional charge storage. In the example, a reset transistor 434 is coupled between a power line (e.g., reset voltage source) and the first floating diffusion FD1 418. The reset transistor 434 is coupled to be controlled in response to a reset control signal RSTG 444. In the illustrated example, a dual floating diffusion transistor 424 is coupled between the first floating diffusion FD1 418 and a LOFIC 432, which is coupled between a bias voltage source 428 and the first floating diffusion FD1 418. In the example, the LOFIC 432 includes insulating material disposed between a first metal electrode (e.g., CTM) and a second metal electrode (e.g., CBM). The dual floating diffusion transistor 424 is coupled to be controlled in response to a dual floating diffusion control signal DFD 438.

In the example, the LOFIC 432 is implemented with a metal-insulator-metal capacitor including an insulating material with high dielectric constant or high-k insulating material disposed between a first metal electrode and a second metal electrode. In various examples, the insulating material disposed between the first metal electrode and the second metal electrode of the LOFIC 432 may be formed of a single layer of high-k material or a multiple layer stack of high-k material. The exact composition and an overall thickness of high-k material may depend on the desired LOFIC capacitance. In the various examples, high-k material may include one of aluminum oxide ($Al_2O_3$), Zirconium dioxide ($ZrO_2$), Hafnium oxide (HfO), or a combination thereof.

As shown in the example depicted in FIG. 4A, an overflow transistor 454 is coupled between photodiode 414-S and the LOFIC 432. In the example, the overflow transistor 454 is controlled in response to an overflow control signal OFG 456. As such, the LOFIC 432 is coupled between the bias voltage source 448 and the dual floating diffusion transistor 424 as well as between the bias voltage source 448 and the overflow transistor 454. Therefore, it is appreciated that the LOFIC 432 is selectively coupled to the first floating diffusion FD1 418 through the dual floating diffusion transistor 424. As such, the LOFIC 432 is selectively coupled to the reset transistor 434 through the dual floating diffusion transistor 424.

In operation, the bias voltage source 448 is configured to provide a bias voltage VCAP to first metal electrode CTM of the LOFIC 432 and the power line is configured to provide a supply voltage to the drain of the reset transistor 434. In one example, the bias voltage VCAP and the supply voltage of the power line are configured to the same voltage. In another example, it is appreciated that the bias voltage source 448 may also configured to provide the bias voltage VCAP to the drain of the reset transistor 434. During the idle period as shown in the example depicted in FIG. 4A, the reset transistor 434 is configured to be turned on in response to the reset control signal RSTG 444 having a high value. In one example, the dual floating diffusion transistor 424 is also configured to be turned on in response to the dual floating diffusion control signal 438 having a high value. As such, the second metal electrode CBM of the LOFIC 432 is also coupled to receive the supply voltage through the dual floating diffusion transistor 424, the first floating diffusion FD1 418, and through the reset transistor 434 while the first metal electrode CTM of LOFIC 432 is coupled to the bias voltage source 448, which causes a special forced bias or auto-zero across LOFIC 432 during the idle period and therefore discharges the LOFIC 432 in accordance with the teachings of the present invention. In operation, both the first and second metal electrodes (e.g., CTM and CBM) of LOFIC 432 are therefore both locally short coupled to a high reset voltage through the reset transistor RST 434, the first floating diffusion FD1 418, and the dual floating diffusion transistor 424 during the idle period, which forces the LOFIC 432 to discharge, which reduces the image lag problem in accordance with the teachings of the present invention.

In the depicted example, it is noted that the transfer transistor 416-S is biased with a transfer control signal STX 436-S equal to 0V and that the overflow transistor 454 is biased with an overflow control signal OFG 456 equal to negative voltage value that may range between −1V to −2V. As such, it is appreciated that the bias of the transfer transistor 416-S is much higher than the bias of the overflow transistor 454 so that excess image charge photogenerated in the photodiode 414-S overflows through the transfer transistor 416-S to the first floating diffusion FD1 418 instead of through the overflow transistor 454 to the LOFIC 432 during the idle period. In the example, it is also noted that the excess image charge photogenerated in the photodiodes 414-L1, 414-L2, and 414-L3 may also overflow through transfer transistors 416-L1, 416-L2, and 416-L3, respectively, to the first floating diffusion FD1 418, which is then drained out through the reset transistor 434 during the idle period.

Figure 4B:
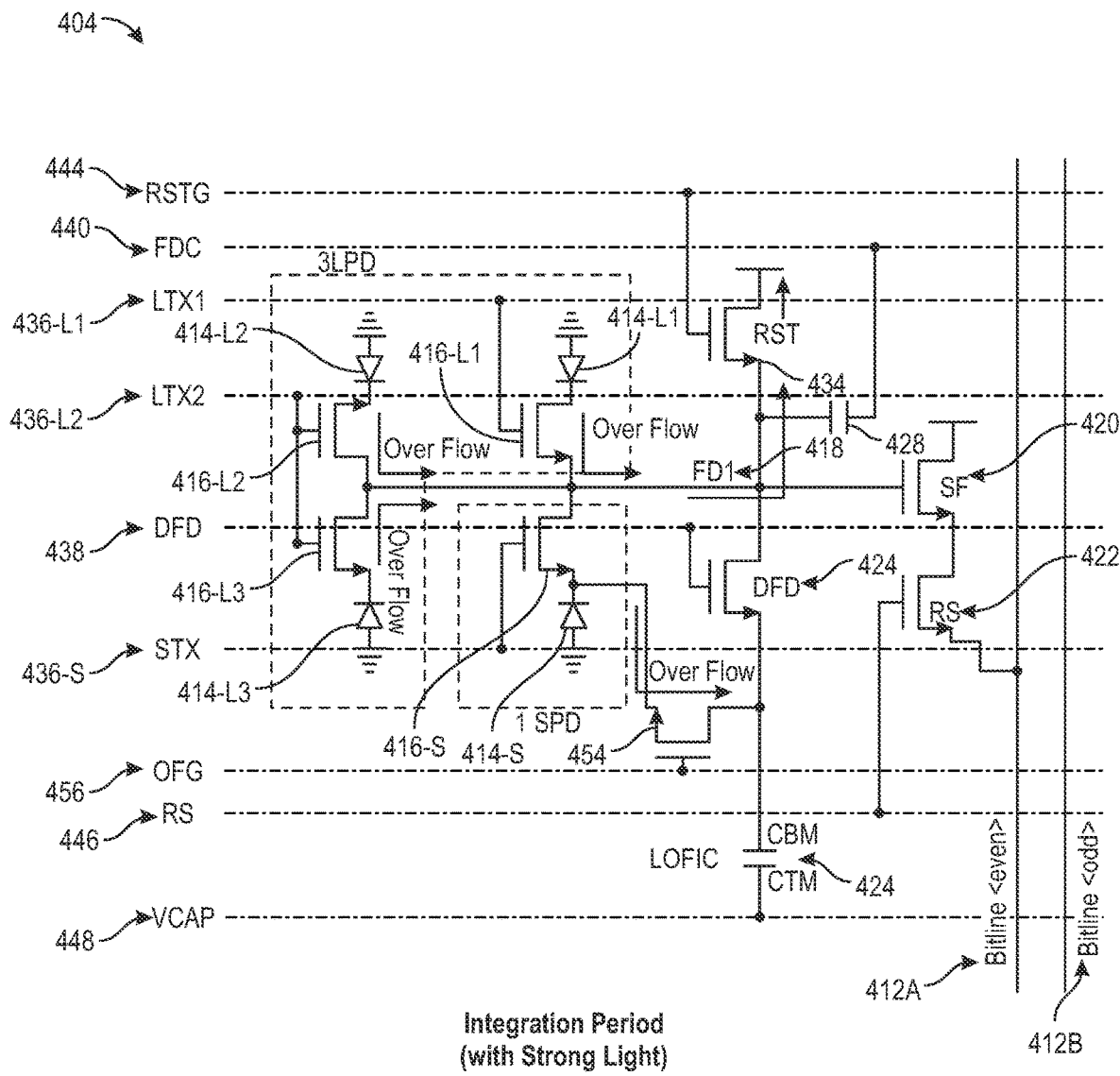
FIG. 4B illustrates a schematic of another example of a pixel circuit including a lateral overflow integration capacitor (LOFIC) during an integration period in accordance with the teachings of the present disclosure.

FIG. 4B illustrates a schematic of another example of a pixel circuit including a lateral overflow integration capacitor (LOFIC) during an integration period in accordance with the teachings of the present disclosure. It is appreciated that the pixel circuit 404 of FIG. 4B may be an example of one of the pixel circuits 104 included in pixel array 102 as shown in FIG. 1, and that similarly named and numbered elements described above are coupled and function similarly below. It is also appreciated that the pixel circuit 404 depicted in FIG. 4B is substantially similar to the pixel circuit 404 depicted in FIG. 4A discussed in detail above, except that the pixel circuit 404 illustrated in FIG. 4B is depicted during an integration period, which occurs after the idle period illustrated in FIG. 4A, after the precharge period, and before the readout period.

To illustrate, as shown in the example depicted in FIG. 4B, pixel circuit 404 includes a plurality of photodiodes that are configured to photogenerate image charge in response to incident light. In the depicted example, the plurality of photodiodes includes a grouping of photodiodes 414-L1, 414-L2, and 414-L3 that are configured to function collectively as a large photodiode with three photodiodes (e.g., 3 LPD). In addition, the plurality of photodiodes also includes a photodiode 414-S that is configured to function individually as a small photodiode (e.g., 1 SPD). In some embodiments, the large photodiode may have greater sensitivity to incident light than the small photodiode. In the depicted example, pixel circuit 404 also includes a first floating diffusion FD1 418 coupled to receive the image charge from the photodiodes 414-L1, 414-L2, 414-L3, and 414-S through a transfer transistors 416-S, 416-L1, 416-L2, and 414-L3, respectively. In the example, the transfer transistors 416-S, 416-L1, 416-L2, and 414-L3 are coupled to be controlled in response to a transfer control signals LTX1 436-L1, LTX2 436-L2, LTX3 436-L3, and STX 436-S, respectively, to transfer image charge from the photodiodes 414-L1, 414-L2, 414-L3, and 414-S to the first floating diffusion FD1 418. A source follower transistor 420 has a gate coupled to the first floating diffusion FD1 418, and a row select transistor 422 is coupled to the source follower transistor SF 420 such that the source follower transistor 420 and the row select transistor 422 are coupled between a power line and a bitline 412A to output an image signal from the pixel circuit 404 in response to a row select control signal RS 446 and the amount of charge at the gate of the source follower transistor 420.

In the depicted example, a second capacitor 428 is coupled to the first floating diffusion FD1 418 and is coupled to receive a floating diffusion capacitor signal FDC 440. In the example, a reset transistor 434 is coupled between a power line and the first floating diffusion FD1 418. The reset transistor 434 is coupled to be controlled in response to a reset control signal RSTG 444. In the illustrated example, a dual floating diffusion transistor 424 is coupled between the first floating diffusion FD1 418 and a LOFIC 432, which is coupled between a bias voltage source 428 and the first floating diffusion FD1 418. In the example, the LOFIC 432 includes insulating material (e.g., insulating material with high dielectric constant) disposed between a first metal electrode (e.g., CTM) and a second metal electrode (e.g., CBM). The dual floating diffusion transistor 424 is coupled to be controlled in response to a dual floating diffusion control signal DFD 438. As shown in the example depicted in FIG. 4B, an overflow transistor 454 is coupled between photodiode 414-S and the LOFIC 432. In the example, the overflow transistor 454 is controlled in response to an overflow control signal OFG 456.

In operation, the bias voltage source 448 is configured to provide a bias voltage VCAP to first metal electrode CTM of the LOFIC 432 and the power line is configured to provide a supply voltage to the drain of the reset transistor 434. During the integration period as shown in the example depicted in FIG. 4B, the reset transistor 434 is configured to be turned on in response to the reset control signal RSTG 444 having a high value. In addition, it is noted that the transfer transistor 416-S is negatively biased with a transfer control signal STX 436-S equal to a negative voltage value (e.g., a negative voltage between −1V to −2V) and that the overflow transistor 454 is biased with an overflow control signal OFG 456 equal to a voltage value (e.g., 0V to −2V). In the depicted example, it is appreciated that the photodiode profile of photodiode 414-S is turned by process so that excess image charge photogenerated in the photodiode 414-S overflows through the overflow transistor 454 to the LOFIC 432 during the integration period. In the example, it is also noted that the excess image charge photogenerated in the photodiodes 414-L1, 414-L2, and 414-L3 overflow through transfer transistors 416-L1, 416-L2, and 416-L3, respectively, to the first floating diffusion FD1 418 during the integration period.

Figure 5A:
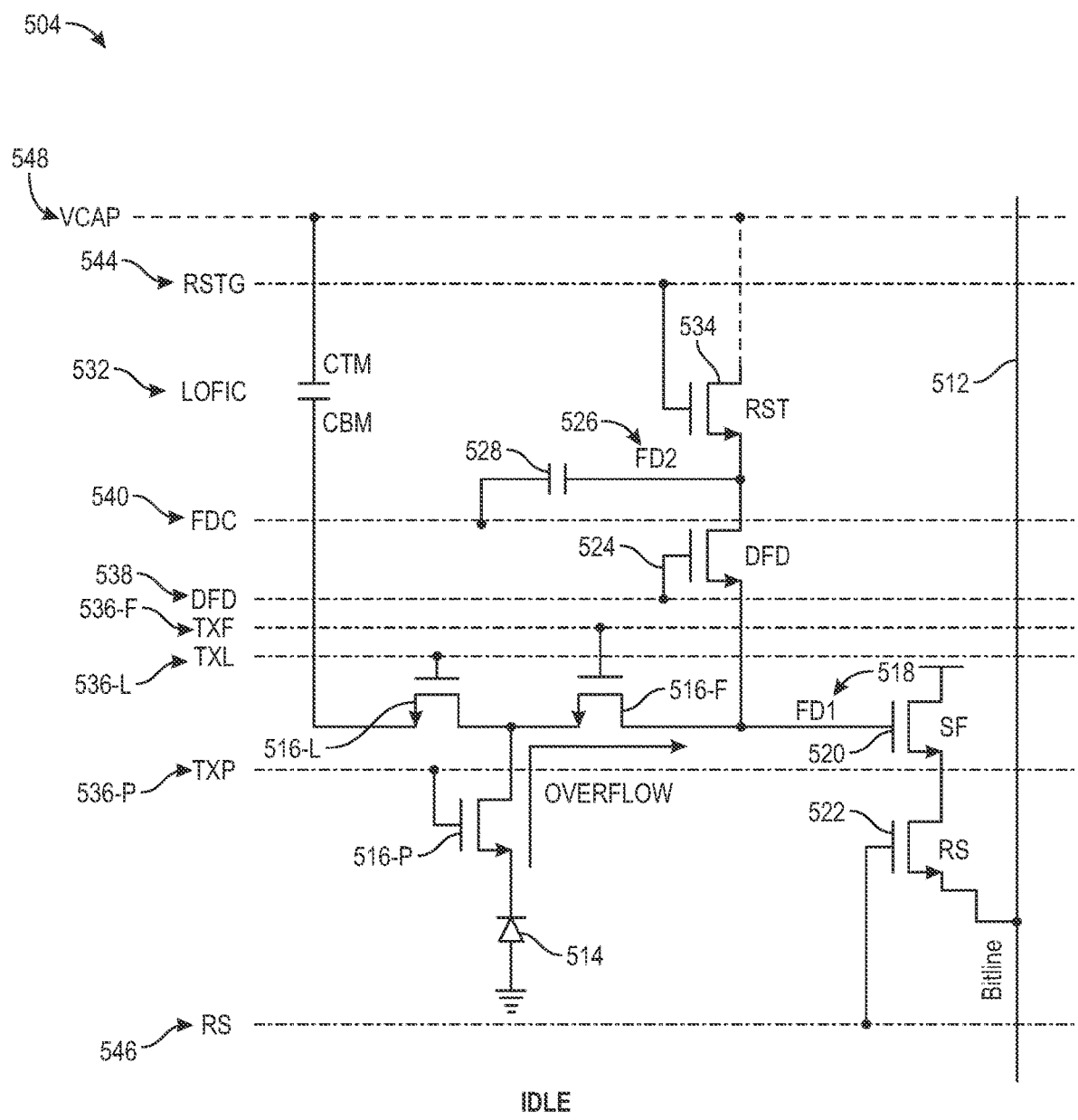
FIG. 5A illustrates a schematic of yet another example of a pixel circuit including a lateral overflow integration capacitor (LOFIC) during an idle period in accordance with the teachings of the present disclosure.

FIG. 5A illustrates a schematic of yet another example of a pixel circuit 504 including a lateral overflow integration capacitor (LOFIC) during an idle period in accordance with the teachings of the present disclosure. It is appreciated that the pixel circuit 504 of FIG. 5A may be an example of one of the pixel circuits 104 included in pixel array 102 as shown in FIG. 1, and that similarly named and numbered elements described above are coupled and function similarly below. It is also appreciated that the pixel circuit 504 depicted in FIG. 5A shares some similarities with pixel circuit 204 depicted in FIGS. 2A-2E and the pixel circuit 404 depicted in FIGS. 4A-4B discussed in detail above.

For instance, as shown in the example depicted in FIG. 5A, pixel circuit 504 includes a photodiode 514, which is configured to photogenerate image charge in response to incident light. In the depicted example, pixel circuit 504 also includes a first floating diffusion FD1 518 coupled to receive the image charge from the photodiode 514.

One difference between pixel circuit 504 of FIG. 5A and pixel circuit 204 of FIGS. 2A-2E and/or pixel circuit 404 of FIGS. 4A-4B as the transfer transistor included in pixel circuit 504 of FIG. 5A includes or is implemented with a multi-gate transistor structure. In the particular example depicted in FIG. 5A, the multi-gate transistor structure is a trigate transistor structure that includes a photodiode gate 516-P, a floating diffusion gate 516-F, and a LOFIC gate 516-L. In the example, the photodiode gate 516-P is coupled to the photodiode 514, the floating diffusion gate 516-F is coupled to the first floating diffusion FD1 518 and the photodiode gate 516-P, and the LOFIC gate 516-F is coupled to a LOFIC 532, the photodiode gate 516-P, and the floating diffusion gate 516-F as shown. The photodiode gate 516-P is coupled to be controlled in response to photodiode transfer control signal TXP 536-P, the floating diffusion gate 526-F is coupled to be controlled in response to a floating diffusion transfer control signal TXF 536-F, and the LOFIC gate 516-L is coupled to be controlled in response to a LOFIC transfer control signal TXL 536-L. The photodiode gate 516-P, a floating diffusion gate 516-F, and a LOFIC gate 516-L are separately disposed and electrically isolated. In one example, insulation material with sufficient thickness is disposed between photodiode gate 516-P, floating diffusion gate 516-F, and LOFIC gate 516-L.

As will be discussed, in operation, image charge is configured to be transferred from the photodiode 514 to the first floating diffusion FD1 518 through the photodiode gate 516-P and through the floating diffusion gate 516-F during a readout period, and excess image charge photogenerated by the photodiode 514 during an idle period is configured to overflow from the photodiode 514 into the first floating diffusion FD1 518 through the photodiode gate 514-P and through the floating diffusion gate 516-F.

A source follower transistor 520 has a gate coupled to the first floating diffusion FD1 518, and a row select transistor 522 is coupled to the source follower transistor SF 520 such that the source follower transistor 520 and the row select transistor 522 are coupled between a power line and a bitline 512 to output an image signal from the pixel circuit 504 in response to a row select control signal RS 546 and the amount of charge at the gate of the source follower transistor 520.

In the example illustrated in FIG. 5A, a dual floating diffusion DFD transistor 524 is coupled between the first floating diffusion FD1 518 and a second capacitor 528. The drain of the dual floating diffusion DFD transistor 524 that is coupled to the second capacitor 528 may also be referred to as a second floating diffusion FD2 526. The second capacitor 528 is coupled to receive a floating diffusion capacitor signal FDC 540. The reset transistor 534 is coupled between a bias voltage source 548 and the dual floating diffusion transistor 524. The dual floating diffusion transistor 524 is coupled to be controlled in response to a dual floating diffusion control signal DFD 538 and the reset transistor 534 is coupled to be controlled in response to a reset control signal RSTG 544.

As mentioned above, the LOFIC gate 516-L is coupled to the LOFIC 532, the photodiode gate 516-P is coupled to the photodiode 514, and the floating diffusion gate 516-F is coupled to the first floating diffusion FD1 518. As such, the LOFIC gate 516-L and the photodiode gate 516-P are coupled between the LOFIC 532 and the photodiode 514, the floating diffusion gate 516-F and the photodiode gate 516-P are coupled between the first floating diffusion FD1 518 and the photodiode 514, and the LOFIC gate 516-L and the floating diffusion gate 516-F are coupled between the LOFIC 532 and the first floating diffusion FD1 518. Therefore, it is appreciated that the LOFIC 532 is selectively coupled to the first floating diffusion FD1 518 through the LOFIC gate 516-L and the floating diffusion gate 516-F, which are selectively coupled to the reset transistor 534 through the dual floating diffusion transistor 524. In addition, the LOFIC 532 is coupled between the bias voltage source 548 and the LOFIC gate 516-L.

In the example, the LOFIC 532 is implemented with a metal-insulator-metal capacitor including an insulation material having high dielectric constant or a high-k insulating material disposed between a first metal electrode and a second metal electrode. In one example, it is appreciated that the first metal electrode of LOFIC 532 may be referred to as a capacitor top metal (CTM) coupled to bias voltage source 548 and the second metal electrode of LOFIC 532 may be referred to as a capacitor bottom metal (CBM) coupled to the LOFIC gate 516-L.

As shown in the example depicted in FIG. 5A, during the idle period, the bias voltage source 548 is configured to provide a bias voltage VCAP, which in various examples may have a value of VCAP_lo to VCAP_hi. In the example, during the idle period, the reset control signal RSTG 544 may have a high voltage value of 2.5V to 4V, the dual floating diffusion control signal DFD 538 may have a high voltage value between 2.5V to 4V, the LOFIC transfer control signal TXL 536-L may have a value of −1V to −2V, the floating diffusion transfer control signal TXF 536-F may have a value of 2.5V to 4V, and the photodiode transfer control signal TXP 536-P may have a value of 0V to 3V. It is appreciated that in the example depicted in FIG. 5A, the LOFIC 532 is separated from the anti-blooming path from the photodiode 514 such that the LOFIC gate 516-L, the photodiode gate 516-P, and the floating diffusion gate 516-F are biased to prevent excess image charge photogenerated by the photodiode 514 during the idle period from overflowing into the LOFIC 532. Instead, as shown in the depicted example, the excess image charge photogenerated by the photodiode 514 during the idle period is configured to overflow into the first floating diffusion FD1 518 through the photodiode gate 516-P and the floating diffusion gate 516-F, which is then drained out through the reset transistor 534 to bias voltage source 548 during the idle period in accordance with the teachings of the present invention.

Figure 5B:
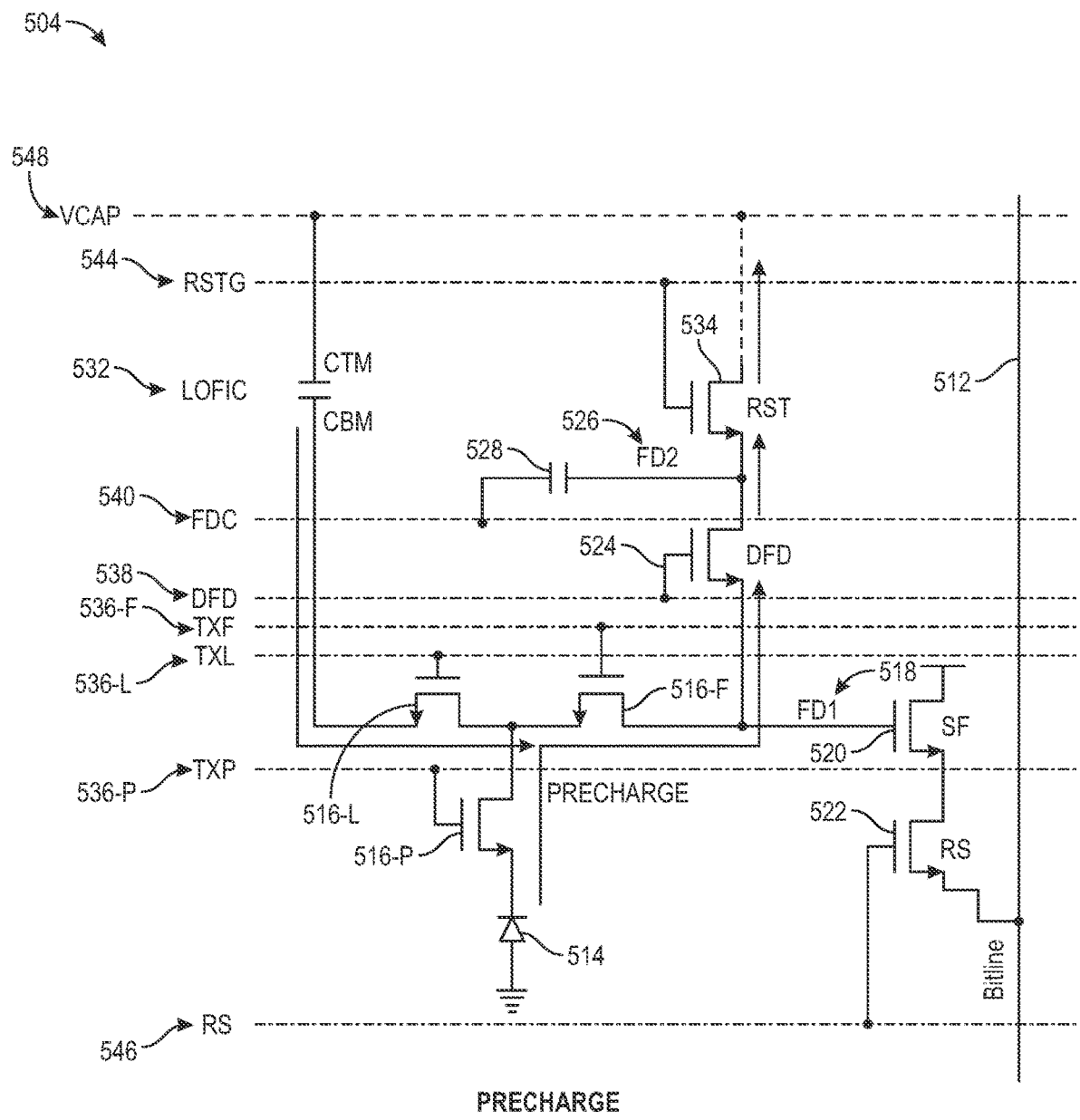
FIG. 5B illustrates a schematic of yet another example of a pixel circuit including a lateral overflow integration capacitor (LOFIC) during a precharge period in accordance with the teachings of the present disclosure.

FIG. 5B illustrates a schematic of yet another example of a pixel circuit 504 including a lateral overflow integration capacitor (LOFIC) during a precharge period in accordance with the teachings of the present disclosure. It is appreciated that the pixel circuit 504 of FIG. 5B may be an example of one of the pixel circuits 104 included in pixel array 102 as shown in FIG. 1, and that similarly named and numbered elements described above are coupled and function similarly below. It is also appreciated that the pixel circuit 504 depicted in FIG. 5B is substantially similar to the pixel circuit 504 depicted in FIG. 5A discussed in detail above, except that the pixel circuit 504 illustrated in FIG. 5B is depicted during a precharge period, which occurs after the idle period illustrated in FIG. 5A and before an integration period and readout period.

As shown in the example depicted in FIG. 5B, pixel circuit 504 includes a photodiode 514, which is configured to photogenerate image charge in response to incident light. In the depicted example, pixel circuit 504 also includes a first floating diffusion FD1 518 coupled to receive the image charge from the photodiode 514. Pixel circuit 504 also includes the multi-gate transistor structure that includes a photodiode gate 516-P, a floating diffusion gate 516-F, and a LOFIC gate 516-L. In the example, the photodiode gate 516-P is coupled to the photodiode 514, the floating diffusion gate 516-F is coupled to the first floating diffusion FD1 518 and the photodiode gate 516-P, and the LOFIC gate 516-F is coupled to a LOFIC 532, the photodiode gate 516-P, and the floating diffusion gate 516-F as shown. The photodiode gate 516-P is coupled to be controlled in response to photodiode transfer control signal TXP 536-P, the floating diffusion gate 526-F is coupled to be controlled in response to a floating diffusion transfer control signal TXF 536-F, and the LOFIC gate 516-L is coupled to be controlled in response to a LOFIC transfer control signal TXL 536-L.

A source follower transistor SF 520 has a gate coupled to the first floating diffusion FD1 518, and a row select transistor 522 is coupled to the source follower transistor SF 520 such that the source follower transistor 520 and the row select transistor 522 are coupled between a power line and a bitline 512 to output an image signal from the pixel circuit 504 in response to a row select control signal RS 546 and the amount of charges accumulated at the gate of the source follower transistor SF 520. A dual floating diffusion DFD transistor 524 is coupled between the first floating diffusion FD1 518 and a second capacitor 528. The drain of the dual floating diffusion DFD transistor 524 that is coupled to the second capacitor 528 may also be referred to as a second floating diffusion FD2 526. The second capacitor 528 is coupled to receive a floating diffusion capacitor signal FDC 540. The reset transistor 534 is coupled between a bias voltage source 548 and the dual floating diffusion transistor 524. The dual floating diffusion transistor 524 is coupled to be controlled in response to a dual floating diffusion control signal DFD 538 and the reset transistor 534 is coupled to be controlled in response to a reset control signal RSTG 544.

As mentioned above, the LOFIC gate 516-L is coupled to the LOFIC 532, the photodiode gate 516-P is coupled to the photodiode 514, and the floating diffusion gate 516-F is coupled to the first floating diffusion FD1 518. As such, the LOFIC gate 516-L and the photodiode gate 516-P are coupled between the LOFIC 532 and the photodiode 514, the floating diffusion gate 516-F and the photodiode gate 516-P are coupled between the first floating diffusion FD1 518 and the photodiode 514, and the LOFIC gate 516-L and the floating diffusion gate 516-F are coupled between the LOFIC 532 and the first floating diffusion FD1 518. Therefore, it is appreciated that the LOFIC 532 is selectively coupled to the first floating diffusion FD1 518 through the LOFIC gate 516-L and the floating diffusion gate 516-F, which are selectively coupled to the reset transistor 534 through the dual floating diffusion transistor 524. In addition, the LOFIC 532 is coupled between the bias voltage source 548 and the LOFIC gate 516-L. In the example, the LOFIC 532 is implemented with a metal-insulator-metal capacitor including an insulating material with high dielectric constant or a high-k insulating material disposed between a first metal electrode (e.g., CTM) and a second metal electrode (e.g., CBM).

As shown in the example depicted in FIG. 5B, during the precharge period, the bias voltage source 548 is configured to provide a bias voltage VCAP, which in the example has a value of VCAP_hi (e.g., a value between 2.5V to 4V). In the example, during the precharge period, the reset control signal RSTG 544 may have a high voltage value between 2.5V to 3.5V, the dual floating diffusion control signal DFD 538 may have a high voltage value between 2.5V 4V, the LOFIC transfer control signal TXL 536-L may have a high voltage value between 2.5V and 4V, the floating diffusion transfer control signal TXF 536-F may have a high voltage value between 2.5V to 3.5V, and the photodiode transfer control signal TXP 536-P may have a value between 2.5V to 3.5V. In one example, the reset control signal RSTG 544 is configured to be greater than the bias voltage VCAP to properly drive the reset transistor RST 534 resetting the first floating diffusion FD1 518, second floating diffusion FD2 526, the photodiode 514, at same time auto-zeroing the LOFIC 532. As such, it is appreciated that during the precharge period, the first metal electrode (e.g., CTM) of LOFIC 532 is coupled to the bias voltage source 548 and that the second metal electrode (e.g., CBM) is also locally coupled to the bias voltage source 548 through the LOFIC gate 516-L, through the floating diffusion gate 516-F, through the first floating diffusion FD1 518, through the dual floating diffusion transistor 524, through the second floating diffusion FD2 526, and through the reset transistor 534 to be reset during the precharge period. In the example, it is appreciated that the photodiode 514, the first floating diffusion FD1 518, and the second capacitor 528 are also coupled to the bias voltage source 548 to be reset during the precharge period.

Figure 5C:
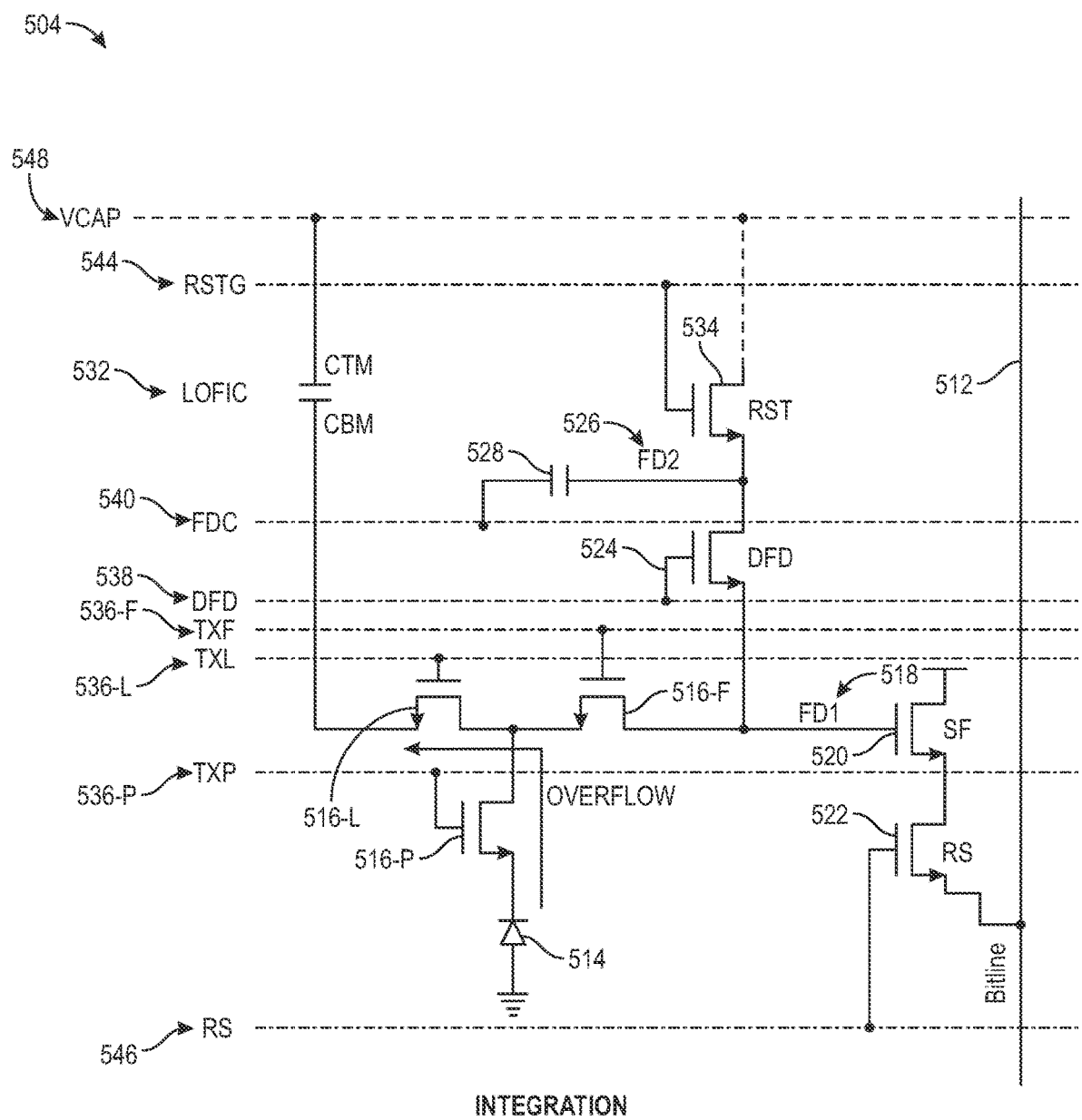
FIG. 5C illustrates a schematic of yet another example of a pixel circuit including a lateral overflow integration capacitor (LOFIC) during an integration period in accordance with the teachings of the present disclosure.

FIG. 5C illustrates a schematic of yet another example of a pixel circuit 504 including a lateral overflow integration capacitor (LOFIC) during an integration period in accordance with the teachings of the present disclosure. It is appreciated that the pixel circuit 504 of FIG. 5C may be an example of one of the pixel circuits 104 included in pixel array 102 as shown in FIG. 1, and that similarly named and numbered elements described above are coupled and function similarly below. It is also appreciated that the pixel circuit 504 depicted in FIG. 5C is substantially similar to the pixel circuit 504 depicted in FIGS. 5A-5B discussed in detail above, except that the pixel circuit 504 illustrated in FIG. 5C is depicted during an integration period, which occurs after the precharge period illustrated in FIG. 5B and before a readout period.

As shown in the example depicted in FIG. 5C, pixel circuit 504 includes a photodiode 514, which is configured to photogenerate image charge in response to incident light. In the depicted example, pixel circuit 504 also includes a first floating diffusion FD1 518 coupled to receive the image charge from the photodiode 514. Pixel circuit 504 also includes the multi-gate transistor structure that includes a photodiode gate 516-P, a floating diffusion gate 516-F, and a LOFIC gate 516-L. In the example, the photodiode gate 516-P is coupled to the photodiode 514, the floating diffusion gate 516-F is coupled to the first floating diffusion FD1 518 and the photodiode gate 516-P, and the LOFIC gate 516-F is coupled to a LOFIC 532, the photodiode gate 516-P, and the floating diffusion gate 516-F as shown. The photodiode gate 516-P is coupled to be controlled in response to photodiode transfer control signal TXP 536-P, the floating diffusion gate 526-F is coupled to be controlled in response to a floating diffusion transfer control signal TXF 536-F, and the LOFIC gate 516-L is coupled to be controlled in response to a LOFIC transfer control signal TXL 536-L.

A source follower transistor SF 520 has a gate coupled to the first floating diffusion FD1 518, and a row select transistor 522 is coupled to the source follower transistor SF 520 such that the source follower transistor SF 520 and the row select transistor 522 are coupled between a power line and a bitline 512 to output an image signal from the pixel circuit 504 in response to a row select control signal RS 546 and the amount of charge at the gate of the source follower transistor 520. A dual floating diffusion DFD transistor 524 is coupled between the first floating diffusion FD1 518 and a second capacitor 528. The drain of the dual floating diffusion DFD transistor 524 that is coupled to the second capacitor 528 may also be referred to as a second floating diffusion FD2 526. The second capacitor 528 is coupled to the source of the reset transistor 534 and further coupled to receive a floating diffusion capacitor signal FDC 540. The reset transistor 534 is coupled between a bias voltage source 548 and the dual floating diffusion transistor 524. The dual floating diffusion transistor 524 is coupled to be controlled in response to a dual floating diffusion control signal DFD 538 and the reset transistor 534 is coupled to be controlled in response to a reset control signal RSTG 544.

As mentioned above, the LOFIC gate 516-L is coupled to the LOFIC 532, the photodiode gate 516-P is coupled to the photodiode 514, and the floating diffusion gate 516-F is coupled to the first floating diffusion FD1 518. As such, the LOFIC gate 516-L and the photodiode gate 516-P are coupled between the LOFIC 532 and the photodiode 514, the floating diffusion gate 516-F and the photodiode gate 516-P are coupled between the first floating diffusion FD1 518 and the photodiode 514, and the LOFIC gate 516-L and the floating diffusion gate 516-F are coupled between the LOFIC 532 and the first floating diffusion FD1 518. Therefore, it is appreciated that the LOFIC 532 is selectively coupled to the first floating diffusion FD1 518 through the LOFIC gate 516-L and the floating diffusion gate 516-F, which are selectively coupled to the reset transistor 534 through the dual floating diffusion transistor 524. In addition, the LOFIC 532 is coupled between the bias voltage source 548 and the LOFIC gate 516-L. In the example, the LOFIC 532 is implemented with a metal-insulator-metal capacitor including an insulation material having high dielectric constant or a high-k insulating material disposed between a first metal electrode (e.g., CTM) and a second metal electrode (e.g., CBM).

As shown in the example depicted in FIG. 5C, during the integration period, the bias voltage source 548 is configured to provide a bias voltage VCAP, which in the example has a value of VCAP_lo. In the example, during the integration period, the reset control signal RSTG 544 may have a value of 0V, the dual floating diffusion control signal DFD 538 may have a value of 0V, the LOFIC transfer control signal TXL 536-L may have a value of 0V to 1.0V, the floating diffusion transfer control signal TXF 536-F may have a value of 0V, and the photodiode transfer control signal TXP 536-P may have a negative voltage value between −1V to −2V. As such, it is appreciated that during the integration period, the excess image charge photogenerated by photodiode 514 in response to bright light is configured to overflow through the LOFIC gate 516-L to the LOFIC 532 instead of the through the floating diffusion gate 516-F into the first floating diffusion FD1 518.

Figure 6:
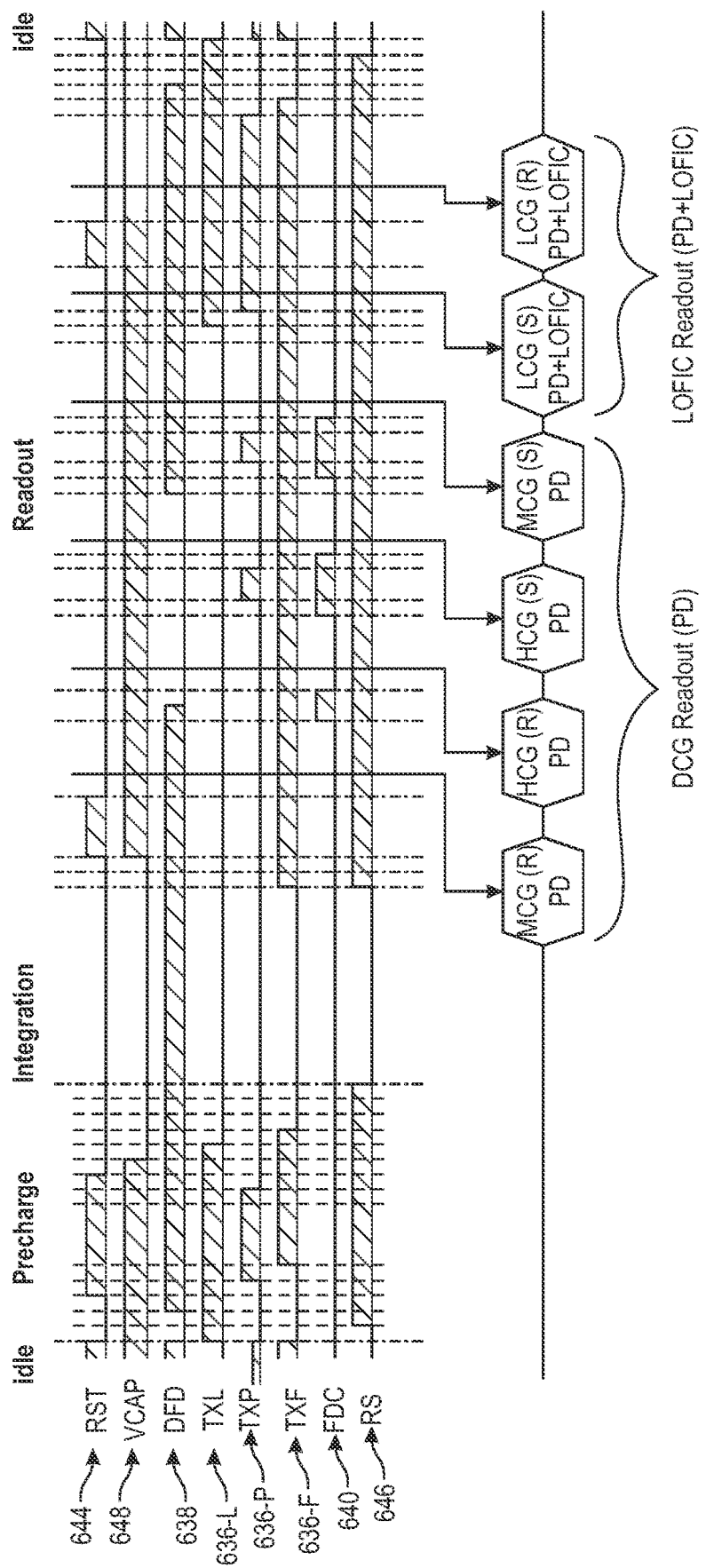
FIG. 6 illustrates one example of a timing diagram of example signal values in yet another example pixel circuit including a LOFIC during idle, precharge, integration, and readout periods in accordance with the teachings of the present disclosure.

FIG. 6 illustrates one example of a timing diagram of example signal values in yet another example pixel circuit including a LOFIC during idle, precharge, integration, and readout periods in accordance with the teachings of the present disclosure. It is appreciated that the signals depicted in FIG. 6 may be examples of the signals depicted in FIGS. 5A-5C, and that similarly named and numbered elements described above are coupled and function similarly below.

Referring now to the depicted example, FIG. 6 illustrates a reset control signal RST 644, a bias voltage VCAP 648, a dual floating diffusion control signal DFD 638, a LOFIC transfer control signal TXL 636-L, a photodiode transfer control signal TXP 636-P, a floating diffusion transfer control signal TXF 636-F, a floating diffusion capacitor signal FDC 640, and a row select control signal RS 646, which are configured to control the respective circuit elements discussed in detail above in FIGS. 5A-5C. The example depicted in FIG. 6 also illustrates the idle, precharge, integration, and readout periods that the pixel circuit cycles through in order when generating image data.

As shown during the idle period depicted in FIG. 6, the reset control signal RST 644 turns on the reset transistor 534, and the bias voltage VCAP 648 is equal to a high capacitor bias value (e.g., VCAP_hi), which is coupled to the first metal electrode CTM of the LOFIC 532 and the drain of the reset transistor 534. The dual floating diffusion control signal DFD 638 turns on the dual floating diffusion transistor 524, which therefore couples the first floating diffusion FD1 518 to receive the bias voltage VCAP 548 through the reset transistor 534. In the example, the LOFIC transfer control signal TXL 636-L is equal to a low value, the photodiode transfer control signal TXP 636-P is equal to a low value, and the floating diffusion transfer control signal TXF 636-F is equal to a high value. As such, it is appreciated that during the idle period, excess image charge photogenerated in the photodiode 514 is configured to overflow through the floating diffusion gate 516-F into the first floating diffusion FD1 518, which is then drained through the reset transistor 534 during the idle period in accordance with the teachings of the present invention. Continuing with the depicted example, the floating diffusion capacitor signal FDC 640 and the row select signal RS 646 are configured to equal a low value during the idle period.

The example depicted in FIG. 6 shows that during the precharge period, which occurs after the idle period, the bias voltage VCAP 648 remains at a high value, and the LOFIC transfer control signal TXL 636-L turns on the LOFIC gate 516-L, and then the row select control signal RS 646 turns on the row select transistor 522. Next, the dual floating diffusion control signal DFD 638 turns on the dual floating diffusion transistor 524, and then the reset control signal RST 644 turns on the reset transistor 534, and then the photodiode transfer control signal TXP 636-P turns on the photodiode gate 516-P, and then the floating diffusion transfer control signal TXF 636-F turn on the floating diffusion gate 516-F, which resets the LOFIC 532, the photodiode 514, the first floating diffusion FD1 518, and the second capacitor 528 during the precharge period.

Afterwards, the photodiode transfer control signal TXP 636-P turns off the photodiode gate 516-P, and then the reset control signal RST 644 turns off the reset transistor 534, and then the bias voltage VCAP 648 transitions to a low capacitor bias value (e.g., VCAP_lo), and then LOFIC transfer control signal TXL 636-L turns off the LOFIC gate 516-L, and then the floating diffusion transfer control signal TXF 636-F turns off the floating diffusion gate 516-F, and then the row select signal RS 646 turns off the row select transistor 522.

The example depicted in FIG. 6 shows that during the integration period, which occurs after the precharge period, all of the signals are low, except the dual floating diffusion control signal 638 which remains high, and integration occurs, during which time the photodiode 514 generates image charge in response to incident light. It is appreciated that during the integration period, excess image charge photogenerated by the photodiode 514 is configured to overflow through the LOFIC gate 516-L into the LOFIC 532 in accordance with the teachings of the present invention.

The example depicted in FIG. 6 shows that during the readout period, which occurs after the integration period, the dual floating diffusion control signal DFD 638 remains high, the floating diffusion transfer control signal TXF 636-F turns on the floating diffusion gate 516-F, and the row select signal RS 646 turns on the row select transistor 522. Next, the reset control signal 644 turns in the reset transistor 534 and the bias voltage VCAP 648 transitions to a high capacitor bias value (e.g., VCAP_hi).

Next, a dual conversion gain (DCG) readout of the photodiode occurs during which time the reset control signal RST 644 transitions to a low value and then a medium conversion gain (MCG) readout of a reset value (R) from the photodiode 514 occurs. Next, the floating diffusion capacitor signal FDC 640 is pulsed while the dual floating diffusion control signal DFD 638 turns off the dual floating diffusion transistor 524. Next, a high conversion gain (HCG) readout of a reset value (R) from the photodiode 514 occurs. Next, the floating diffusion capacitor signal FDC 640 transitions to a high value, and the photodiode transfer control signal TXP 636-P turns on the photodiode transfer gate 516-P, during which time image charge in the photodiode 514 transfers to the first floating diffusion FD1 518. Next, a high conversion gain (HCG) readout of a signal value (S) may occur after the photodiode transfer control signal TXP 636-P and the floating diffusion capacitor signal FDC 640 transition to a low value. Next, the dual floating diffusion control signal DFD 638 turns on the dual floating diffusion transistor 524, the floating diffusion capacitor signal FDC 640 transitions to a high value, and the photodiode transfer control signal TXP 536-P turns on the photodiode transfer gate 516-P, during which time image charge in the photodiode 514 transfers to the first floating diffusion FD1 518 and the second capacitor 528. Next, a medium conversion gain (MCG) readout of a signal value (S) may occur after the photodiode transfer control signal TXP 536-P and the floating diffusion capacitor signal FDC 540 transition to a low value.

Next, a LOFIC readout of the photodiode 514 and the LOFIC 532 occurs, during which time the LOFIC transfer control signal TXL 636-L turns on the LOFIC transfer gate 516-L, and then the photodiode transfer control signal TXP 636-P turns on the photodiode transfer gate 516-P, during which time image charge in the photodiode 514 transfers to the first floating diffusion FD1 518, the second capacitor 528, and the LOFIC 532. Next, a low conversion gain (LCG) readout of a signal value (S) may occur. Next, the reset control signal RST 644 turns on the reset transistor 534, during which time the photodiode 514, the first floating diffusion FD1 518, the second capacitor 528, and the LOFIC 532 are all reset through the reset transistor 534, the second floating diffusion FD2 526, the dual floating diffusion transistor 524, the first floating diffusion FD1 518, the photodiode transfer gate 516-P, and the LOFIC transfer gate 516-L with the bias voltage VCAP 648 set to the high capacitor bias value (e.g., VCAP_hi). Next, the reset transistor 534 is turned off and then a low conversion gain (LCG) readout of a reset value (R) occurs.

Next, the process described in FIG. 6 cycles back to an idle period, at which time the cycle repeats in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A pixel circuit, comprising:
   a photodiode configured to photogenerate image charge during in response to incident light;
   a floating diffusion coupled to receive the image charge;
   a transfer transistor coupled between the photodiode and the floating diffusion, wherein the transfer transistor is configured to transfer the image charge from the photodiode to the floating diffusion;
   a reset transistor coupled between a reset voltage source and the floating diffusion, wherein the reset transistor is configured to be switched in response to a reset control signal; and
   a lateral overflow integration capacitor (LOFIC) including an insulating region disposed between a first metal electrode and a second metal electrode, wherein the first metal electrode is coupled to a bias voltage source, wherein the second metal electrode is selectively coupled to the floating diffusion, wherein excess image charge photogenerated by the photodiode during an idle period is configured to overflow from the photodiode through the transfer transistor into the floating diffusion.

2. The pixel circuit of claim 1, wherein the excess image charge photogenerated by the photodiode during an integration period is configured to overflow from the photodiode into the LOFIC instead of into the floating diffusion, wherein the idle period occurs before the integration period.

3. The pixel circuit of claim 2, wherein the reset control signal is configured to turn on the reset transistor during the idle period is to discharge the LOFIC through the floating diffusion during the idle period.

4. The pixel circuit of claim 3, wherein the reset voltage source is the bias voltage source, wherein the reset control signal is configured to turn on the reset transistor to couple the first and the second metal electrodes to the bias voltage source during the idle period and during a precharge period to discharge the LOFIC, wherein the precharge period occurs after the idle period and before the integration period.

5. The pixel circuit of claim 4, wherein a bias voltage provided by the bias voltage source is configured to equal a second bias voltage during the idle period, during the precharge period, and during a readout period that occurs after the integration period, wherein the bias voltage is configured to equal a first bias voltage during the integration period.

6. The pixel circuit of claim 5, wherein the first bias voltage is a low capacitor bias voltage, wherein the second bias voltage is a high capacitor bias voltage, wherein the low capacitor bias voltage is less than the high capacitor bias voltage.

7. The pixel circuit of claim 3, further comprising a dual floating diffusion (DFD) transistor coupled between the floating diffusion and the second metal electrode, wherein the DFD transistor is configured to be switched in response to a DFD control signal.

8. The pixel circuit of claim 7, further comprising an overflow transistor coupled between the photodiode and the second metal electrode, wherein the excess image charge photogenerated by the photodiode during the integration period is configured to overflow from the photodiode through the overflow transistor into the LOFIC instead of into the floating diffusion through the transfer transistor, wherein the excess image charge photogenerated by the photodiode during the idle period is configured to overflow from the photodiode through the transfer transistor into the floating diffusion instead of into the LOFIC through the overflow transistor.

9. The pixel circuit of claim 6, wherein the LOFIC is a first capacitor, wherein the pixel circuit further comprises:
a second capacitor coupled to the reset transistor; and
a dual floating diffusion (DFD) transistor coupled between the floating diffusion and the second capacitor, wherein the DFD transistor is configured to be switched in response to a DFD control signal.

10. The pixel circuit of claim 9, further comprising:
a source follower transistor having a gate coupled to the floating diffusion; and
a row select transistor coupled to the source follower transistor, wherein the source follower transistor and the row select transistor are coupled between a power line and a bitline.

11. The pixel circuit of claim 10, further comprising a low conversion gain (LFG) transistor coupled between the floating diffusion and the second metal electrode, wherein the LFG transistor is configured to be switched in response to an LFG control signal.

12. The pixel circuit of claim 11, wherein the second metal electrode is configured to be coupled to the reset transistor through the DFD transistor, the floating diffusion, and the LFG transistor during the idle period and during the precharge period.

13. The pixel circuit of claim 12, further comprising an overflow transistor coupled between the photodiode and the second metal electrode, wherein the excess image charge photogenerated by the photodiode during the integration period is configured to overflow from the photodiode through the overflow transistor into the LOFIC instead of into the floating diffusion through the transfer transistor, wherein the excess image charge photogenerated by the photodiode during the idle period is configured to overflow from the photodiode through the transfer transistor into the floating diffusion instead of into the LOFIC through the overflow transistor.

14. The pixel circuit of claim 1, wherein the transfer transistor is included in a bypass transistor having a dual gate structure including an overflow gate coupled between the LOFIC and the photodiode, and a transfer gate coupled between the photodiode and the floating diffusion.

15. The pixel circuit of claim 1, wherein the transfer transistor comprises a multi-gate transistor structure, wherein the multi-gate transistor structure comprises:
a photodiode gate coupled to the photodiode;
a floating diffusion gate coupled to the floating diffusion and the photodiode gate; and
a LOFIC gate coupled to the LOFIC, the photodiode gate, and the floating diffusion gate,
wherein image charge is configured to be transferred from the photodiode to the floating diffusion through the photodiode gate and through the floating diffusion gate during a readout period,
wherein the excess image charge photogenerated by the photodiode during the idle period is configured to overflow from the photodiode into the floating diffusion through the photodiode gate and through the floating diffusion gate.

16. The pixel circuit of claim 15, wherein the second metal electrode is coupled to the reset transistor through the floating diffusion, the floating diffusion gate, and the LOFIC gate to discharge the LOFIC during the idle period and during a precharge period.

17. The pixel circuit of claim 16, wherein the excess image charge photogenerated by the photodiode during an integration period is configured to overflow from the photodiode into the LOFIC through the photodiode gate and through the LOFIC gate.

18. An imaging system, comprising:
a pixel array including a plurality of pixel circuits arranged in a plurality of rows and a plurality of columns, wherein each one of the pixel circuits includes:
a photodiode configured to photogenerate image charge in response to incident light;
a floating diffusion coupled to receive the image charge;
a transfer transistor coupled between the photodiode and the floating diffusion, wherein the transfer transistor is configured to transfer the image charge from the photodiode to the floating diffusion;
a reset transistor coupled between a reset voltage source and the floating diffusion, wherein the reset transistor is configured to be switched in response to a reset control signal; and
a lateral overflow integration capacitor (LOFIC) including an insulating region disposed between a first metal electrode and a second metal electrode, wherein the first metal electrode is coupled to a bias voltage source, wherein the second metal electrode is selectively coupled to the floating diffusion, wherein excess image charge photogenerated by the photodiode during an idle period is configured to overflow from the photodiode through the transfer transistor into the floating diffusion, wherein the idle period occurs before a precharge period, which occurs before an integration period, which occurs before a readout period;
a control circuitry coupled to the pixel array to control operation of the pixel array; and a readout circuitry coupled to the pixel array to read out image data from the plurality of pixel circuits.

19. The imaging system of claim 18, further comprising function logic coupled to the readout circuitry to store the image data from each one of the plurality of pixel circuits.

20. The imaging system of claim 18, wherein the excess image charge photogenerated by the photodiode during the integration period is configured to overflow from the photodiode into the LOFIC instead of into the floating diffusion.

21. The imaging system of claim 20, wherein the reset control signal is configured to turn on the reset transistor during the idle period to discharge the LOFIC through the floating diffusion during the idle period.

22. The imaging system of claim 21, wherein the reset voltage source is the bias voltage source, wherein the reset control signal is configured to turn on the reset transistor to couple the first and the second metal electrodes to the bias voltage source during the idle period and during a precharge period to discharge the LOFIC.

23. The imaging system of claim 22, wherein a bias voltage provided by the bias voltage source is configured to equal a second bias voltage during the idle period, during the precharge period, and during the readout period, wherein the bias voltage is configured to equal a first bias voltage during the integration period, wherein the first bias voltage is a low capacitor bias voltage, wherein the second bias voltage is a high capacitor bias voltage, wherein the low capacitor bias voltage is less than the high capacitor bias voltage.

24. The imaging system of claim 21, wherein each one of the pixel circuits further comprises a dual floating diffusion (DFD) transistor coupled between the floating diffusion and the second metal electrode, wherein the DFD transistor is configured to be switched in response to a DFD control signal.

25. The imaging system of claim 24, wherein each one of the pixel circuits further comprises an overflow transistor coupled between the photodiode and the second metal electrode, wherein the excess image charge photogenerated by the photodiode during the integration period is configured to overflow from the photodiode through the overflow transistor into the LOFIC instead of into the floating diffusion through the transfer transistor, wherein the excess image charge photogenerated by the photodiode during the idle period is configured to overflow from the photodiode through the transfer transistor into the floating diffusion instead of into the LOFIC through the overflow transistor.

26. The imaging system of claim 23, wherein the LOFIC is a first capacitor, wherein the pixel circuit further comprises:
a second capacitor coupled to the reset transistor; and
a dual floating diffusion (DFD) transistor coupled between the floating diffusion and the second capacitor, wherein the DFD transistor is configured to be switched in response to a DFD control signal.

27. The imaging system of claim 26, wherein each one of the pixel circuits further comprises:
a source follower transistor having a gate coupled to the floating diffusion; and
a row select transistor coupled to the source follower transistor, wherein the source follower transistor and the row select transistor are coupled between a power line and a bitline.

28. The imaging system of claim 27, wherein each one of the pixel circuits further comprises a low conversion gain (LFG) transistor coupled between the floating diffusion and the second metal electrode, wherein the LFG transistor is configured to be switched in response to an LFG control signal.

29. The imaging system of claim 28, wherein the second metal electrode is configured to be coupled to the reset transistor through, the DFD transistor, the floating diffusion, and the LFG transistor during the idle period and during the precharge period.

30. The imaging system of claim 29, wherein each one of the pixel circuits further comprises an overflow transistor coupled between the photodiode and the second metal electrode, wherein the excess image charge photogenerated by the photodiode during the integration period is configured to overflow from the photodiode through the overflow transistor into the LOFIC instead of into the floating diffusion through the transfer transistor, wherein the excess image charge photogenerated by the photodiode during the idle period is configured to overflow from the photodiode through the transfer transistor into the floating diffusion instead of into the LOFIC through the overflow transistor.

31. The imaging system of claim 18, wherein the transfer transistor is included in a bypass transistor having a dual gate structure including an overflow gate coupled between the LOFIC and the photodiode, and a transfer gate coupled between the photodiode and the floating diffusion.

32. The imaging system of claim 18, wherein the transfer transistor comprises a multi-gate transistor structure, wherein the multi-gate transistor structure comprises:
a photodiode gate coupled to the photodiode;
a floating diffusion gate coupled to the floating diffusion and the photodiode gate; and
a LOFIC gate coupled to the LOFIC, the photodiode gate, and the floating diffusion gate,
wherein image charge is configured to be transferred from the photodiode to the floating diffusion through the photodiode gate and through the floating diffusion gate during the readout period,
wherein the excess image charge photogenerated by the photodiode during the idle period is configured to overflow from the photodiode into the floating diffusion through the photodiode gate and through the floating diffusion gate.

33. The imaging system of claim 32, wherein the second metal electrode is coupled to the reset transistor through the floating diffusion, the floating diffusion gate, and the LOFIC gate to discharge the LOFIC during the idle period and during the precharge period.

34. The imaging system of claim 33, wherein the excess image charge photogenerated by the photodiode during the integration period is configured to overflow from the photodiode into the LOFIC through the photodiode gate and through the LOFIC gate.

* * * * *